(12) United States Patent
Vaish et al.

(10) Patent No.: US 12,267,482 B2
(45) Date of Patent: Apr. 1, 2025

(54) CONTROLLING AND EDITING PRESENTATION OF VOLUMETRIC CONTENT

(71) Applicant: Snap Inc., Santa Monica, CA (US)

(72) Inventors: Rajan Vaish, Beverly Hills, CA (US); Sven Kratz, Mercer Island, WA (US); Andrés Monroy-Hernández, Princeton, NJ (US); Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/900,407

(22) Filed: Aug. 31, 2022

(65) Prior Publication Data

US 2024/0073404 A1 Feb. 29, 2024

(51) Int. Cl.
| | |
|---|---|
| *H04N 13/398* | (2018.01) |
| *G11B 27/031* | (2006.01) |
| *H04N 13/167* | (2018.01) |
| *H04N 13/366* | (2018.01) |
| *H04N 13/388* | (2018.01) |

(52) U.S. Cl.
CPC ......... *H04N 13/398* (2018.05); *G11B 27/031* (2013.01); *H04N 13/167* (2018.05); *H04N 13/366* (2018.05); *H04N 13/388* (2018.05)

(58) Field of Classification Search
CPC .. H04N 13/388; H04N 13/398; H04N 13/167; H04N 13/366
USPC ......................................................... 345/427
See application file for complete search history.

(56) References Cited

U.S. PATENT DOCUMENTS

| | | |
|---|---|---|
| 4,807,158 A | 2/1989 | Blanton et al. |
| 6,038,295 A | 3/2000 | Mattes |
| 6,430,997 B1 | 8/2002 | French et al. |
| 6,819,982 B2 | 11/2004 | Doane |
| 6,980,909 B2 | 12/2005 | Root et al. |
| 7,173,651 B1 | 2/2007 | Knowles |
| 7,190,496 B2 | 3/2007 | Klug et al. |
| 7,411,493 B2 | 8/2008 | Smith |
| 7,535,890 B2 | 5/2009 | Rojas |

(Continued)

FOREIGN PATENT DOCUMENTS

| | | |
|---|---|---|
| CA | 2887596 | 7/2015 |
| CN | 105912129 | 8/2016 |

(Continued)

OTHER PUBLICATIONS

US 10,656,660 B1, 05/2020, Meisenholder et al. (withdrawn)

(Continued)

*Primary Examiner* — Javid A Amini
(74) *Attorney, Agent, or Firm* — Schwegman Lundberg & Woessner, P.A.

(57) ABSTRACT

A display device presents volumetric content comprising a volumetric video. The volumetric video comprises a volumetric representation of one or more elements a three-dimensional space. Input indicative of a control operation associated with the presentation of the volumetric video is received. The presentation of the volumetric video by the display device is controlled by executing the control operation. While the control operation is being executed, the volumetric representation of the one or more elements of the three-dimensional space are displayed from multiple perspectives based on movement of a user.

20 Claims, 12 Drawing Sheets

(56) References Cited

U.S. PATENT DOCUMENTS

| | | |
|---|---|---|
| 7,542,073 B2 | 6/2009 | Li et al. |
| 8,046,719 B2 | 10/2011 | Skourup et al. |
| 8,131,597 B2 | 3/2012 | Hudetz |
| 8,174,562 B2 | 5/2012 | Hartman |
| 8,199,747 B2 | 6/2012 | Rojas et al. |
| 8,274,550 B2 | 9/2012 | Steuart, III |
| 8,332,475 B2 | 12/2012 | Rosen et al. |
| 8,608,563 B2 | 12/2013 | Miyazaki et al. |
| 8,646,720 B2 | 2/2014 | Shaw |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,934,015 B1 | 1/2015 | Chi et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,186,548 B2 | 11/2015 | House et al. |
| 9,191,776 B2 | 11/2015 | Root et al. |
| 9,204,252 B2 | 12/2015 | Root |
| 9,235,932 B2 | 1/2016 | Choi et al. |
| 9,344,642 B2 | 5/2016 | Niemi et al. |
| 9,345,711 B2 | 5/2016 | Friedhoff |
| 9,443,227 B2 | 9/2016 | Evans et al. |
| 9,445,081 B1 | 9/2016 | Kouperman et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,703,369 B1 | 7/2017 | Mullen |
| 9,723,272 B2 | 8/2017 | Lu et al. |
| 9,747,901 B1 | 8/2017 | Gentry |
| 9,761,057 B2 | 9/2017 | Salter et al. |
| 9,779,538 B2 | 10/2017 | Sanders et al. |
| 9,794,527 B1 | 10/2017 | Balez et al. |
| 9,818,225 B2 | 11/2017 | Wang et al. |
| 9,916,673 B2 | 3/2018 | Castro et al. |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,282,903 B1 | 5/2019 | Clark et al. |
| 10,289,193 B1 | 5/2019 | Hardy et al. |
| 10,313,481 B2 | 6/2019 | Kada |
| 10,325,410 B1 | 6/2019 | Smith et al. |
| 10,365,784 B2 | 7/2019 | Inomata |
| 10,370,118 B1 | 8/2019 | Nielsen et al. |
| 10,403,050 B1 | 9/2019 | Beall et al. |
| 10,445,925 B2 | 10/2019 | Tokubo |
| 10,482,665 B2 | 11/2019 | Copic et al. |
| 10,501,180 B2 | 12/2019 | Yu |
| 10,504,277 B1 | 12/2019 | Haitani et al. |
| 10,581,940 B1 | 3/2020 | Iyer et al. |
| 10,599,286 B2 | 3/2020 | Inomata |
| 10,616,663 B2 | 4/2020 | Davisson et al. |
| 10,768,639 B1 | 9/2020 | Meisenholder et al. |
| 10,768,776 B2 | 9/2020 | Roche et al. |
| 10,796,489 B1 | 10/2020 | Cordes et al. |
| 10,819,946 B1 | 10/2020 | Tanumihardja et al. |
| 10,901,215 B1 | 1/2021 | Newcombe et al. |
| 10,937,239 B2 | 3/2021 | Huston et al. |
| 11,006,095 B2 | 5/2021 | Holzer et al. |
| 11,051,049 B2 | 6/2021 | Bustamante et al. |
| 11,062,517 B2 | 7/2021 | Crews et al. |
| 11,094,127 B2 | 8/2021 | Mccall |
| 11,126,206 B2 | 9/2021 | Meisenholder et al. |
| 11,156,830 B2 | 10/2021 | Johnson et al. |
| 11,194,439 B2 | 12/2021 | Laaksonen et al. |
| 11,200,028 B2 | 12/2021 | Newell et al. |
| 11,200,742 B1 | 12/2021 | Post et al. |
| 11,302,077 B2 | 4/2022 | Kang et al. |
| 11,372,474 B2 | 6/2022 | Schweet et al. |
| 11,413,514 B2 | 8/2022 | Marty et al. |
| 11,436,806 B1 | 9/2022 | Katz |
| 11,468,605 B2 | 10/2022 | Corson |
| 11,481,423 B1 | 10/2022 | Singleton |
| 11,481,980 B2 | 10/2022 | Yerli |
| 11,495,004 B1 | 11/2022 | Henry |
| 11,623,138 B2 | 4/2023 | Yeh et al. |
| 11,734,905 B1 | 8/2023 | Henry |
| 11,810,259 B2 | 11/2023 | Ramani et al. |
| 11,847,749 B2 | 12/2023 | Lebeaupin et al. |
| 11,941,764 B2 | 3/2024 | Harding et al. |
| 11,972,521 B2 | 4/2024 | Vaish et al. |
| 2004/0135890 A1 | 7/2004 | Kaneko et al. |
| 2006/0287025 A1 | 12/2006 | French |
| 2007/0167689 A1 | 7/2007 | Ramadas et al. |
| 2007/0250526 A1 | 10/2007 | Hanna |
| 2008/0081676 A1 | 4/2008 | Chakraborty et al. |
| 2008/0158256 A1 | 7/2008 | Russell et al. |
| 2008/0186255 A1 | 8/2008 | Cohen et al. |
| 2008/0211771 A1 | 9/2008 | Richardson |
| 2008/0255842 A1 | 10/2008 | Simhi |
| 2009/0122133 A1 | 5/2009 | Hartman |
| 2009/0171902 A1 | 7/2009 | Maclaurin et al. |
| 2009/0187389 A1 | 7/2009 | Dobbins et al. |
| 2009/0213114 A1 | 8/2009 | Dobbins et al. |
| 2010/0026809 A1 | 2/2010 | Curry |
| 2010/0125799 A1 | 5/2010 | Roberts et al. |
| 2010/0185984 A1 | 7/2010 | Wright et al. |
| 2010/0260422 A1 | 10/2010 | Ito et al. |
| 2011/0179313 A1 | 7/2011 | Macdonald et al. |
| 2011/0202598 A1 | 8/2011 | Evans et al. |
| 2011/0242134 A1 | 10/2011 | Miller et al. |
| 2011/0261083 A1 | 10/2011 | Wilson |
| 2012/0052947 A1 | 3/2012 | Yun |
| 2012/0188452 A1* | 7/2012 | Keiser .................. H04N 5/2224 348/559 |
| 2012/0194420 A1 | 8/2012 | Osterhout et al. |
| 2012/0209924 A1 | 8/2012 | Evans et al. |
| 2012/0263154 A1 | 10/2012 | Blanchflower et al. |
| 2012/0281885 A1 | 11/2012 | Syrdal et al. |
| 2012/0287274 A1 | 11/2012 | Bevirt |
| 2012/0320169 A1* | 12/2012 | Bathiche .............. G02B 27/017 348/53 |
| 2013/0056581 A1 | 3/2013 | Sparks |
| 2013/0072296 A1 | 3/2013 | Miyazaki et al. |
| 2013/0083009 A1 | 4/2013 | Geisner et al. |
| 2013/0083173 A1 | 4/2013 | Geisner et al. |
| 2013/0162632 A1 | 6/2013 | Varga et al. |
| 2013/0238168 A1 | 9/2013 | Reyes |
| 2014/0013228 A1 | 1/2014 | Hutten |
| 2014/0038708 A1 | 2/2014 | Davison et al. |
| 2014/0254896 A1 | 9/2014 | Zhou et al. |
| 2014/0357366 A1 | 12/2014 | Koganezawa et al. |
| 2015/0015486 A1 | 1/2015 | Osman et al. |
| 2015/0016777 A1* | 1/2015 | Abovitz ............. G02B 27/0093 385/37 |
| 2015/0022432 A1 | 1/2015 | Stewart et al. |
| 2015/0035862 A1 | 2/2015 | Fischer et al. |
| 2015/0070272 A1 | 3/2015 | Kim et al. |
| 2015/0175263 A1 | 6/2015 | Reyes |
| 2015/0193979 A1 | 7/2015 | Grek |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0355711 A1 | 12/2015 | Rihn |
| 2015/0362917 A1 | 12/2015 | Wang et al. |
| 2015/0363034 A1 | 12/2015 | Hinckley et al. |
| 2016/0004390 A1 | 1/2016 | Laska et al. |
| 2016/0027218 A1 | 1/2016 | Salter et al. |
| 2016/0063987 A1 | 3/2016 | Xu et al. |
| 2016/0071548 A1 | 3/2016 | House et al. |
| 2016/0133230 A1 | 5/2016 | Daniels et al. |
| 2016/0161946 A1 | 6/2016 | Wuth Sepulveda et al. |
| 2016/0179096 A1 | 6/2016 | Bradlow et al. |
| 2016/0292575 A1 | 10/2016 | Weast et al. |

(56) References Cited

U.S. PATENT DOCUMENTS

| | | |
|---|---|---|
| 2016/0292886 A1 | 10/2016 | Erad et al. |
| 2016/0307335 A1 | 10/2016 | Perry et al. |
| 2016/0307573 A1 | 10/2016 | Wobrock |
| 2016/0330532 A1 | 11/2016 | Bostick et al. |
| 2016/0336020 A1 | 11/2016 | Bradlow et al. |
| 2016/0350973 A1 | 12/2016 | Shapira et al. |
| 2016/0357258 A1 | 12/2016 | Yeom et al. |
| 2017/0031369 A1 | 2/2017 | Liu et al. |
| 2017/0061700 A1 | 3/2017 | Urbach et al. |
| 2017/0084051 A1 | 3/2017 | Weising et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0208103 A1 | 7/2017 | Sarmova |
| 2017/0225796 A1 | 8/2017 | Sun et al. |
| 2017/0228690 A1 | 8/2017 | Kohli |
| 2017/0237940 A1 | 8/2017 | Chaney et al. |
| 2017/0244937 A1 | 8/2017 | Meier et al. |
| 2017/0256040 A1 | 9/2017 | Grauer |
| 2017/0266554 A1 | 9/2017 | Marks et al. |
| 2017/0269685 A1 | 9/2017 | Marks et al. |
| 2017/0320564 A1 | 11/2017 | Kuzikov |
| 2017/0324841 A1 | 11/2017 | Clement et al. |
| 2017/0337791 A1 | 11/2017 | Gordon-carroll |
| 2017/0359624 A1 | 12/2017 | Englert et al. |
| 2017/0364153 A1 | 12/2017 | Kazansky et al. |
| 2017/0365098 A1 | 12/2017 | Auten et al. |
| 2017/0365102 A1 | 12/2017 | Huston et al. |
| 2017/0371353 A1 | 12/2017 | Millinger, III |
| 2018/0005429 A1 | 1/2018 | Osman et al. |
| 2018/0059783 A1 | 3/2018 | Van Hoff et al. |
| 2018/0082682 A1 | 3/2018 | Erickson et al. |
| 2018/0098059 A1 | 4/2018 | Valdivia et al. |
| 2018/0130257 A1 | 5/2018 | Moran |
| 2018/0154232 A1* | 6/2018 | Gentil ................ A63B 71/0605 |
| 2018/0246529 A1 | 8/2018 | Hu et al. |
| 2018/0270427 A1 | 9/2018 | Damstra et al. |
| 2018/0288364 A1 | 10/2018 | Virhiä |
| 2018/0311585 A1 | 11/2018 | Osman |
| 2018/0329486 A1 | 11/2018 | Williams et al. |
| 2019/0005728 A1* | 1/2019 | Leppanen ................ G06T 19/20 |
| 2019/0011921 A1 | 1/2019 | Wang et al. |
| 2019/0054379 A1 | 2/2019 | Ackley et al. |
| 2019/0073831 A1 | 3/2019 | Kim |
| 2019/0073832 A1 | 3/2019 | Kim |
| 2019/0130599 A1 | 5/2019 | Gebbie et al. |
| 2019/0130631 A1 | 5/2019 | Gebbie et al. |
| 2019/0138260 A1 | 5/2019 | Rogers et al. |
| 2019/0172265 A1 | 6/2019 | Cossairt et al. |
| 2019/0182471 A1 | 6/2019 | Khalid et al. |
| 2019/0188895 A1 | 6/2019 | Miller, IV et al. |
| 2019/0199993 A1* | 6/2019 | Babu J D ................ G06F 3/00 |
| 2019/0208189 A1 | 7/2019 | Lau et al. |
| 2019/0217189 A1 | 7/2019 | Gutierrez et al. |
| 2019/0278369 A1 | 9/2019 | Ballard |
| 2019/0325654 A1 | 10/2019 | Stisser et al. |
| 2019/0358547 A1 | 11/2019 | Mack et al. |
| 2020/0042160 A1 | 2/2020 | Gabbi et al. |
| 2020/0043235 A1 | 2/2020 | Chapman et al. |
| 2020/0066043 A1 | 2/2020 | Graham et al. |
| 2020/0097077 A1 | 3/2020 | Nguyen et al. |
| 2020/0098179 A1 | 3/2020 | Gough et al. |
| 2020/0098191 A1 | 3/2020 | Mccall |
| 2020/0101372 A1 | 4/2020 | Drake et al. |
| 2020/0126257 A1 | 4/2020 | Tauber |
| 2020/0134911 A1 | 4/2020 | Van Hoff et al. |
| 2020/0159361 A1 | 5/2020 | Rosenberg et al. |
| 2020/0169715 A1 | 5/2020 | Liu et al. |
| 2020/0171394 A1 | 6/2020 | Khan et al. |
| 2020/0241575 A1 | 7/2020 | Meisenholder et al. |
| 2020/0242840 A1 | 7/2020 | Logan et al. |
| 2020/0257367 A1 | 8/2020 | Rihn et al. |
| 2020/0260149 A1 | 8/2020 | Ding et al. |
| 2020/0273243 A1* | 8/2020 | Duffy ................ G06T 17/10 |
| 2020/0279407 A1* | 9/2020 | Liljeroos ................ G06T 15/20 |
| 2020/0289935 A1 | 9/2020 | Azmandian et al. |
| 2020/0314323 A1 | 10/2020 | Van Geel et al. |
| 2020/0341541 A1 | 10/2020 | Olah-Reiken et al. |
| 2020/0349751 A1 | 11/2020 | Bentovim et al. |
| 2020/0371737 A1 | 11/2020 | Leppänen et al. |
| 2020/0394012 A1 | 12/2020 | Wright, Jr. et al. |
| 2020/0409451 A1 | 12/2020 | Mukherjea et al. |
| 2021/0096543 A1 | 4/2021 | Stump et al. |
| 2021/0142578 A1 | 5/2021 | Weinheimer et al. |
| 2021/0159980 A1 | 5/2021 | Ben-Yehuda et al. |
| 2021/0232632 A1 | 7/2021 | Howard |
| 2021/0272367 A1 | 9/2021 | Richter |
| 2021/0279962 A1 | 9/2021 | Hutten et al. |
| 2021/0286179 A1 | 9/2021 | Miller, IV et al. |
| 2021/0287452 A1 | 9/2021 | Maruyama |
| 2021/0289317 A1 | 9/2021 | Son et al. |
| 2021/0312684 A1 | 10/2021 | Zimmermann et al. |
| 2021/0327145 A1 | 10/2021 | Noorkami et al. |
| 2021/0362848 A1 | 11/2021 | Spencer |
| 2021/0382503 A1 | 12/2021 | Meisenholder et al. |
| 2021/0390953 A1 | 12/2021 | Makker et al. |
| 2021/0405772 A1 | 12/2021 | Canberk et al. |
| 2021/0407178 A1 | 12/2021 | Zhou et al. |
| 2022/0014723 A1 | 1/2022 | Pandey et al. |
| 2022/0028108 A1 | 1/2022 | Haapoja et al. |
| 2022/0028170 A1 | 1/2022 | Haapoja et al. |
| 2022/0053219 A1 | 2/2022 | Bathory |
| 2022/0101593 A1 | 3/2022 | Rockel et al. |
| 2022/0103969 A1 | 3/2022 | Drummond et al. |
| 2022/0108539 A1 | 4/2022 | Nussbaum et al. |
| 2022/0116581 A1 | 4/2022 | Miyata et al. |
| 2022/0124143 A1 | 4/2022 | Rafkind et al. |
| 2022/0139055 A1 | 5/2022 | Palmaro |
| 2022/0146833 A1 | 5/2022 | Miller, IV et al. |
| 2022/0164491 A1* | 5/2022 | Palmaro ................ G06F 3/011 |
| 2022/0189075 A1 | 6/2022 | Lynch et al. |
| 2022/0197485 A1 | 6/2022 | Goodrich et al. |
| 2022/0198603 A1 | 6/2022 | Goodrich et al. |
| 2022/0230663 A1 | 7/2022 | Sun et al. |
| 2022/0242450 A1 | 8/2022 | Sokolov et al. |
| 2022/0244835 A1 | 8/2022 | Faulkner et al. |
| 2022/0247929 A1 | 8/2022 | Yang et al. |
| 2022/0269336 A1 | 8/2022 | Lafontaine et al. |
| 2022/0274026 A1 | 9/2022 | Steigelfest et al. |
| 2022/0362631 A1 | 11/2022 | Hong |
| 2023/0063505 A1 | 3/2023 | Chastain et al. |
| 2023/0139337 A1 | 5/2023 | Noam et al. |
| 2023/0173367 A1 | 6/2023 | Marty et al. |
| 2023/0179641 A1 | 6/2023 | Bauer et al. |
| 2023/0237192 A1 | 7/2023 | Kahan et al. |
| 2023/0316681 A1 | 10/2023 | Dolev et al. |
| 2023/0334754 A1 | 10/2023 | Kirchmayer et al. |
| 2023/0341928 A1 | 10/2023 | Traynor et al. |
| 2023/0342989 A1 | 10/2023 | Lehtiniemi et al. |
| 2023/0409114 A1 | 12/2023 | Sun et al. |
| 2023/0412480 A1 | 12/2023 | Greyson et al. |
| 2024/0005623 A1 | 1/2024 | Cooper et al. |
| 2024/0069626 A1 | 2/2024 | Vaish et al. |
| 2024/0069627 A1 | 2/2024 | Vaish et al. |
| 2024/0069637 A1 | 2/2024 | Vaish et al. |
| 2024/0070969 A1 | 2/2024 | Vaish et al. |
| 2024/0071004 A1 | 2/2024 | Vaish et al. |
| 2024/0071006 A1 | 2/2024 | Kratz et al. |
| 2024/0071007 A1 | 2/2024 | Vaish et al. |
| 2024/0071008 A1 | 2/2024 | Vaish et al. |
| 2024/0073402 A1 | 2/2024 | Vaish et al. |
| 2024/0119679 A1 | 4/2024 | Canberk et al. |
| 2024/0119682 A1 | 4/2024 | Rudman et al. |
| 2024/0233224 A1 | 7/2024 | Fan et al. |
| 2024/0273832 A1 | 8/2024 | Newman et al. |

FOREIGN PATENT DOCUMENTS

| | | |
|---|---|---|
| JP | 2010061452 | 3/2010 |
| KR | 20200014587 | 2/2020 |
| KR | 20200109812 | 9/2020 |
| KR | 20210065423 | 6/2021 |
| KR | 20210135859 | 11/2021 |

(56) References Cited

FOREIGN PATENT DOCUMENTS

| KR | 20220064130 | 5/2022 |
|---|---|---|
| WO | 2016105839 | 6/2016 |
| WO | 2021002788 | 1/2021 |
| WO | 2024049687 | 3/2024 |
| WO | 2024049700 | 3/2024 |
| WO | 2024050229 | 3/2024 |
| WO | 2024050231 | 3/2024 |
| WO | 2024050232 | 3/2024 |
| WO | 2024050245 | 3/2024 |
| WO | 2024050259 | 3/2024 |
| WO | 2024050262 | 3/2024 |
| WO | 2024050264 | 3/2024 |
| WO | WO-2024050246 A1 | 3/2024 |

OTHER PUBLICATIONS

Laput, Gierad, "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: URL: http: www.theregister.co.uk 2005 12 12 stealthtext , (Dec. 12, 2005), 1 pg.

Meisenholder, David, "Remoteless Control of Drone Behavior", U.S. Appl. No. 15/640,143, filed Jun. 30, 2017, 108 pgs.

Pourmehr, Shokoofeh, "'You two! Take off!': Creating, Modifying, and Commanding Groups of Robots Using Face Engagement and Indirect Speech in Voice Commands", IEEE RSJ International Conference on Intelligent Robots and Systems (IROS), Tokyo, JP, (2013), 137-142.

Yamada, Wataru, "iSphere: Self-Luminous Spherical Drone Display", Proceedings of the 30th Annual ACM Symposium on User Interface Software and Technology (UIST), Quebec City, CA, (Oct. 22-25, 2017), 635-343.

"International Application Serial No. PCT/US2023/072568, International Search Report mailed Dec. 5, 2023", 3 pgs.

"International Application Serial No. PCT/US2023/072568, Written Opinion mailed Dec. 5, 2023", 4 pgs.

"U.S. Appl. No. 17/899,970, Non Final Office Action mailed Jul. 3, 2023", 22 pgs.

"U.S. Appl. No. 18/056,142, Non Final Office Action mailed Aug. 7, 2023", 12 pgs.

"U.S. Appl. No. 17/899,970, Response filed Oct. 3, 2023 to Non Final Office Action mailed Jul. 3, 2023", 11 pgs.

"U.S. Appl. No. 18/056,142, Response filed Nov. 7, 2023 to Non Final Office Action mailed Aug. 7, 2023", 11 pgs.

"U.S. Appl. No. 17/900,200, Non Final Office Action mailed Nov. 8, 2023", 26 pgs.

"U.S. Appl. No. 18/056,142, Examiner Interview Summary mailed Nov. 7, 2023", 2 pgs.

"U.S. Appl. No. 18/056,142, Notice of Non-Compliant Amendment mailed Nov. 16, 2023", 2 pgs.

"International Application Serial No. PCT US2023 072274, International Search Report mailed Nov. 28, 2023", 3 pgs.

"International Application Serial No. PCT US2023 072274, Written Opinion mailed Nov. 28, 2023", 4 pgs.

"International Application Serial No. PCT US2023 072701, International Search Report mailed Dec. 1, 2023", 3 pgs.

"International Application Serial No. PCT US2023 072701, Written Opinion mailed Dec. 1, 2023", 4 pgs.

"International Application Serial No. PCT US2023 072718, International Search Report mailed Dec. 1, 2023", 3 pgs.

"International Application Serial No. PCT US2023 072718, Written Opinion mailed Dec. 1, 2023", 4 pgs.

"International Application Serial No. PCT US2023 072282, International Search Report mailed Dec. 1, 2023", 4 pgs.

"International Application Serial No. PCT US2023 072282, Written Opinion mailed Dec. 1, 2023", 4 pgs.

"International Application Serial No. PCT US2023 072277, International Search Report mailed Dec. 8, 2023", 4 pgs.

"International Application Serial No. PCT US2023 072277, Written Opinion mailed Dec. 8, 2023", 4 pgs.

"International Application Serial No. PCT US2023 030926, International Search Report mailed Dec. 12, 2023", 3 pgs.

"International Application Serial No. PCT US2023 030926, Written Opinion mailed Dec. 12, 2023", 4 pgs.

"International Application Serial No. PCT US2023 072557, International Search Report mailed Dec. 12, 2023", 3 pgs.

"International Application Serial No. PCT US2023 072557, Written Opinion mailed Dec. 12, 2023", 4 pgs.

"International Application Serial No. PCT US2023 072726, International Search Report mailed Dec. 12, 2023", 3 pgs.

"International Application Serial No. PCT US2023 072726, Written Opinion mailed Dec. 12, 2023", 4 pgs.

"International Application Serial No. PCT US2023 031066, International Search Report mailed Dec. 15, 2023", 3 pgs.

"International Application Serial No. PCT US2023 031066, Written Opinion mailed Dec. 15, 2023", 3 pgs.

"U.S. Appl. No. 17/899,970, Notice of Allowance mailed Dec. 20, 2023", 9 pgs.

"U.S. Appl. No. 17/899,970, Corrected Notice of Allowability mailed Jan. 3, 2024", 5 pgs.

"U.S. Appl. No. 18/056,142, Response filed Jan. 3, 2024 to Notice of Non-Compliant Amendment mailed Nov. 16, 2023", 11 pgs.

"U.S. Appl. No. 17/900,200, Response filed Jan. 31, 2024 to Non Final Office Action mailed Nov. 8, 2023", 14 pgs.

"U.S. Appl. No. 18/058,175, Non Final Office Action mailed Mar. 11, 2024", 14 pgs.

"U.S. Appl. No. 17/899,970, 312 Amendment filed Mar. 20, 2024", 7 pgs.

"U.S. Appl. No. 17/899,970, PTO Response to Rule 312 Communication mailed Mar. 27, 2024", 1 page.

"U.S. Appl. No. 17/899,970, Supplemental Notice of Allowability mailed Mar. 27, 2024", 2 pgs.

"U.S. Appl. No. 18/056,142, Final Office Action mailed Apr. 8, 2024", 15 pgs.

"U.S. Appl. No. 17/900,200, Final Office Action mailed May 6, 2024", 32 pgs.

"U.S. Appl. No. 17/899,935, Non Final Office Action mailed Jun. 6, 2024", 13 pgs.

"U.S. Appl. No. 18/058,175, Examiner Interview Summary mailed Jun. 7, 2024", 2 pgs.

"U.S. Appl. No. 18/058,175, Response filed Jun. 11, 2024 to Non Final Office Action mailed Mar. 11, 2024", 11 pgs.

"U.S. Appl. No. 18/056,142, Response filed Jul. 8, 2024 to Final Office Action mailed Apr. 8, 2024", 13 pgs.

"U.S. Appl. No. 17/900,200, Response filed Aug. 6, 2024 to Final Office Action mailed May 6, 2024", 13 pgs.

"U.S. Appl. No. 18/056,142, Notice of Allowance mailed Aug. 16, 2024", 9 pgs.

Ko, Jonggook, "Hybrid Camera Based Real-Time Human Body Segmentation for Virtual Reality E-learning System", First ACIS JNU International Conference on Computers Networks Systems and Industrial Engineering Jeju Korea South, (2011), 3 pgs.

Langa, Sergi Fernandez, "Multiparty Holomeetings Toward a New Era of Low Cost Volumetric Holographic Meetings in Virtual Reality", IEEE Access vol. 10, (Aug. 3, 2022), 21 pgs.

U.S. Appl. No. 17/900,200, filed Aug. 31, 2022, Multi-Perspective Augmented Reality Experience.

U.S. Appl. No. 17/900,436, filed Aug. 31, 2022, Contextual Memory Experience Triggers System.

U.S. Appl. No. 17/899,970 U.S. Pat. No. 11,972,521, filed Aug. 31, 2022, Multisensorial Presentation of Volumetric Content.

U.S. Appl. No. 18/056,142, filed Nov. 16, 2022, Touch-Based Augmented Reality Experience.

U.S. Appl. No. 18/058,175, filed Nov. 22, 2022, Mixing and Matching Volumetric Contents for New Augmented Reality Experiences.

U.S. Appl. No. 17/899,935, filed Aug. 31, 2022, Social Memory Re-Experiencing System.

U.S. Appl. No. 18/169,631, filed Feb. 15, 2023, Multi-Dimensional Experience Presentation Using Augmented Reality.

(56) References Cited

OTHER PUBLICATIONS

U.S. Appl. No. 17/900,354, filed Aug. 31, 2022, Timelapse Re-Experiencing System.
U.S. Appl. No. 18/170,271, filed Feb. 16, 2023, Generating Immersive Augmented Reality Experiences From Existing Images and Videos.
"U.S. Appl. No. 17/899,935, Response filed Oct. 7, 2024 to Non Final Office Action mailed Jun. 6, 2024", 11 pgs.
"U.S. Appl. No. 17/900,200, Non Final Office Action mailed Aug. 29, 2024", 35 pgs.
"U.S. Appl. No. 17/900,436, Non Final Office Action mailed Sep. 23, 2024", 12 pgs.
"U.S. Appl. No. 18/056,142, Corrected Notice of Allowability mailed Sep. 4, 2024", 2 pgs.
"U.S. Appl. No. 18/058,175, Final Office Action mailed Sep. 19, 2024", 12 pgs.
"U.S. Appl. No. 18/058,175, Response filed Oct. 30, 2024 to Final Office Action mailed Sep. 19, 2024", 9 pgs.
"U.S. Appl. No. 18/169,631, Non Final Office Action mailed Sep. 17, 2024", 28 pgs.
S. A., Aseeri, et al., "The Influence of Avatar Representation and Behavior on Communication in Social Immersive Virtual Environments", IEEE Conference on Virtual Reality and 3D User Interfaces VR Tuebingen Reutlingen Germany, (2018), 2 pgs.
Yanbin, Wang, et al., "Real Time Stereoscopic Rendering of Realistic Avatar for Interactive 3D Telepresence System", 2nd International Conference on Image Vision and Computing ICIVC Chengdu, (2017), 5 pgs.

\* cited by examiner

CONTROLLING AND EDITING PRESENTATION OF VOLUMETRIC CONTENT

TECHNICAL FIELD

The present disclosure generally relates to mobile and wearable computing technology. In particular, example embodiments of the present disclosure address systems, methods, and user interfaces for a controlling and editing presentation of volumetric content to support augmented reality experiences.

BACKGROUND

An augmented reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. A device that supports AR experiences in any one of these approaches is referred to herein as an "AR device." As an example, some electronics-enabled eyewear devices, such as so-called smart glasses, facilitate AR experiences in that allow users to interact with AR content items while a user is engaged in some activity. Users wear the eyewear devices and can view a real-world environment through the eyewear devices while interacting with the AR content that is displayed by the eyewear devices.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
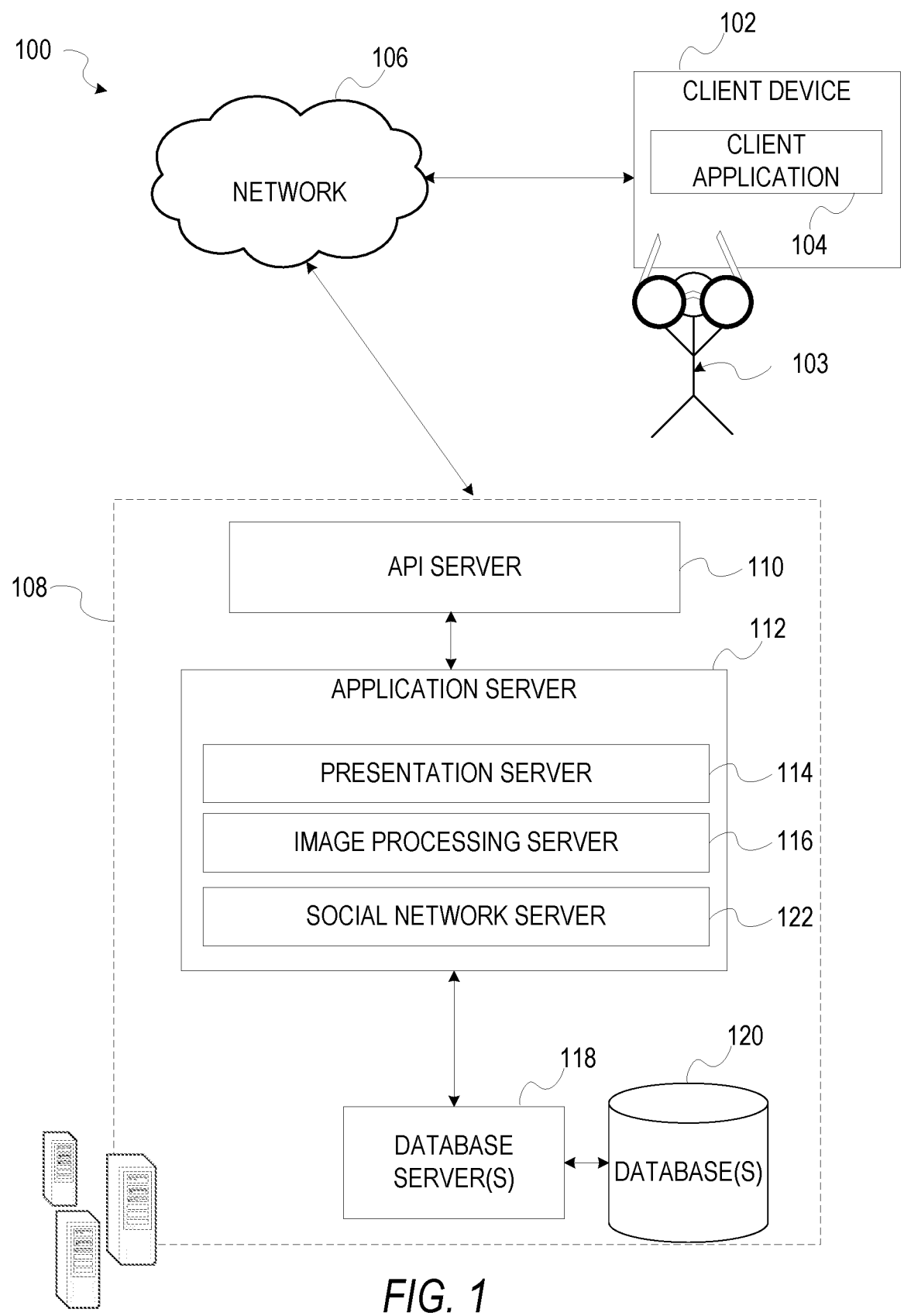
FIG. 1 is a diagrammatic representation of a networked environment in which a volumetric content presentation system may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Volumetric content is an example of an augmented reality (AR) experience. Volumetric content can include volumetric videos and images of three-dimensional spaces captured in three-dimensions (as well as audio signals recorded with volumetric videos and images). Recording of volumetric content includes volumetrically capturing one or more elements of the three-dimensional space such as objects and human beings using a combination of cameras and sensors. The resulting volumetric content includes a volumetric representation of the one or more three-dimensional elements (e.g., an object or a person) of the three-dimensional space. A volumetric representation of an element, typically in the form of an AR content item, refers to a visual representation of the three-dimensional element in three-dimensions. The presentation of the volumetric content may include displaying one or more AR content items overlaid upon a real-world space, which may be the same as the three-dimensional space in which the volumetric video was captured or a different space. The presentation of the volumetric content may include playback of a volumetric video, which may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users.

Conventional volumetric content systems do not include mechanism to allows users to easily control and edit the presentation of volumetric content. Aspects of the present disclosure include systems, methods, techniques, instruction sequences, and computing machine program products to control and edit presentation of volumetric content. The volumetric content presentation system provides an interface that allows users to specify control operations with respect to the presentation of the volumetric content, and the system controls the presentation accordingly. Example control operations include: a stop operation to stop the presentation; a pause operation to pause the presentation; a fast-forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow-motion presentation of the volumetric video).

In an example of the foregoing, volumetric content corresponding to a basketball game is presented. The volumetric content includes volumetric representations (e.g., AR content items) of elements of the basketball game such as a basketball, players, scoreboards, hoops, and the like. During presentation of the volumetric content, a controller system of the volumetric content presentation system allows a user to pause presentation thereby causing volumetric representations of players to freeze while in mid-air, while running, while dribbling, and the like, and while paused the user can observe and interact with the scene in three-dimensions. The user can provide input indicative of a play operation to unpause the presentation and continue to watch the volumetric representations of the players' play. The user may further rewind the presentation of the volumetric representation of the basketball game, resulting in the presentation of volumetric representations of players moving backwards. In addition, a user can zoom in or zoom out to certain elements of the presentation. The user can also fast forward the presentation to have the movement of the volumetric representations speed up, or the user can place the presentation in slow motion to slow down the movement of the players to catch key moments like a player's expression when they are about to make a basket, all as part of an augmented reality experience. By experiencing the presentation of content in AR, the user is made part of the scene rather than just watching it.

In addition, the volumetric content presentation system provides an edit mode that allows users to edit volumetric content and create modified volumetric content therefrom. For example, an augmentation system of the volumetric content presentation system provides an edit mode that allows a user to specify edits to volumetric content such as a modification to a content item (e.g., a change to a size, shape, color, shading or the like), a removal of a content item; an addition of an content item (e.g., selected from a library or other volumetric video); and adding a filter to a content item or a real-world object visible to a user via the presentation of the volumetric content.

Some illustrative examples of the foregoing include applying an echo "filter" to volumetric content to make sounds more memorable, applying musical effects to make content more dramatic, fading certain audio signals (e.g., background noise) while amplifying others audio signals (e.g., laughter or screams) to draw focus on a particular moment, highlighting sound effects such as heartbeat to convey intensity, adding a narration to provide greater context to content, applying a glow effect on legs when running, enhancing stars from star gazing content, adding shining effects to a ball during a soccer game, applying a bling effect on a ring during a marriage proposal, or adding a visual indicator to a gaze of a person to show where their attention is focused. Allowing users to augment volumetric content in this manner can make the volumetric content more compelling and otherwise enhance the overall AR experience.

FIG. 1 is a block diagram showing an example volumetric content presentation system 100 for presenting volumetric content. The volumetric content presentation system 100 includes a client device 102. The client device 102 hosts a number of applications including a presentation client application 104. Each presentation client application 104 is communicatively coupled to a presentation server system 108 via a network 106 (e.g., the Internet). In an example, the client device 102 is a wearable device (e.g., smart glasses) worn by the user 103 that includes a camera and optical elements that include a transparent display through which the real-world environment is visible to the user 103.

A presentation client application 104 is able to communicate and exchange data with another presentation client application 104 and with the presentation server system 108 via the network 106. The data exchanged between the presentation client application 104, and between another presentation client application 104 and the presentation server system 108, includes functions (e.g., commands to invoke functions) as well as payload data (e.g., text, audio, video or other multimedia data).

The presentation server system 108 provides server-side functionality via the network 106 to a particular presentation client application 104. While certain functions of the volumetric content presentation system 100 are described herein as being performed by either a presentation client application 104 or by the presentation server system 108, the location of certain functionality either within the presentation client application 104 or the presentation server system 108 is a design choice. For example, it may be technically preferable to initially deploy certain technology and functionality within the presentation server system 108, but to later migrate this technology and functionality to the presentation client application 104 where the client device (102) has a sufficient processing capacity.

The presentation server system 108 supports various services and operations that are provided to the presentation client application 104. Such operations include transmitting data to, receiving data from, and processing data generated by the presentation client application 104. This data may include volumetric content (e.g., volumetric videos), message content, device information, geolocation information, media annotation and overlays, message content persistence conditions, social network information, and live event information, as examples. Data exchanges within the volumetric content presentation system 100 are invoked and controlled through functions available via user interfaces (UIs) and of the presentation client application 104.

Turning now specifically to the presentation server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the API server 110 provides a set of interfaces (e.g., routines and protocols) that can be called or queried by the presentation client application 104 in order to invoke functionality of the application server 112. The API server 110 exposes various functions supported by the application server 112, including account registration, login functionality, the sending of messages, via the application server 112, from a particular presentation client application 104 to another presentation client application 104, the sending of media files (e.g., volumetric videos) to the presentation client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the presentation client application 104).

The application server 112 hosts a number of applications and subsystems, including a presentation server 114, an image processing server 116 and a social network server 122. The presentation server 114 is generally responsible for managing volumetric content and facilitating presentation thereof by the client device 102. The image processing server 116 is dedicated to performing various image processing operations, typically with respect to images or video generated and displayed by the client device 102. The presentation server 114 and image processing server 116 may work in conjunction to provide one or more AR experiences to the user 103. For example, the presentation server 114 and image processing server 116 may work in conjunction to support presentation of volumetric content by the client device 102. Further details regarding presentation of volumetric content are discussed below.

The social network server 122 supports various social networking functions and services, and makes these functions and services available to the presentation server 114. To this end, the social network server 122 maintains and accesses an entity graph within the database 120. Examples of functions and services supported by the social network server 122 include the identification of other users of the volumetric content presentation system 100 with which a particular user has relationships or is "following", and also the identification of other entities and interests of a particular user.

The application server 112 is communicatively coupled to a database server 118, which facilitates access to a database 120 in which is stored data associated with content processed by the presentation server 114 and image processing server 116.

Figure 2A:
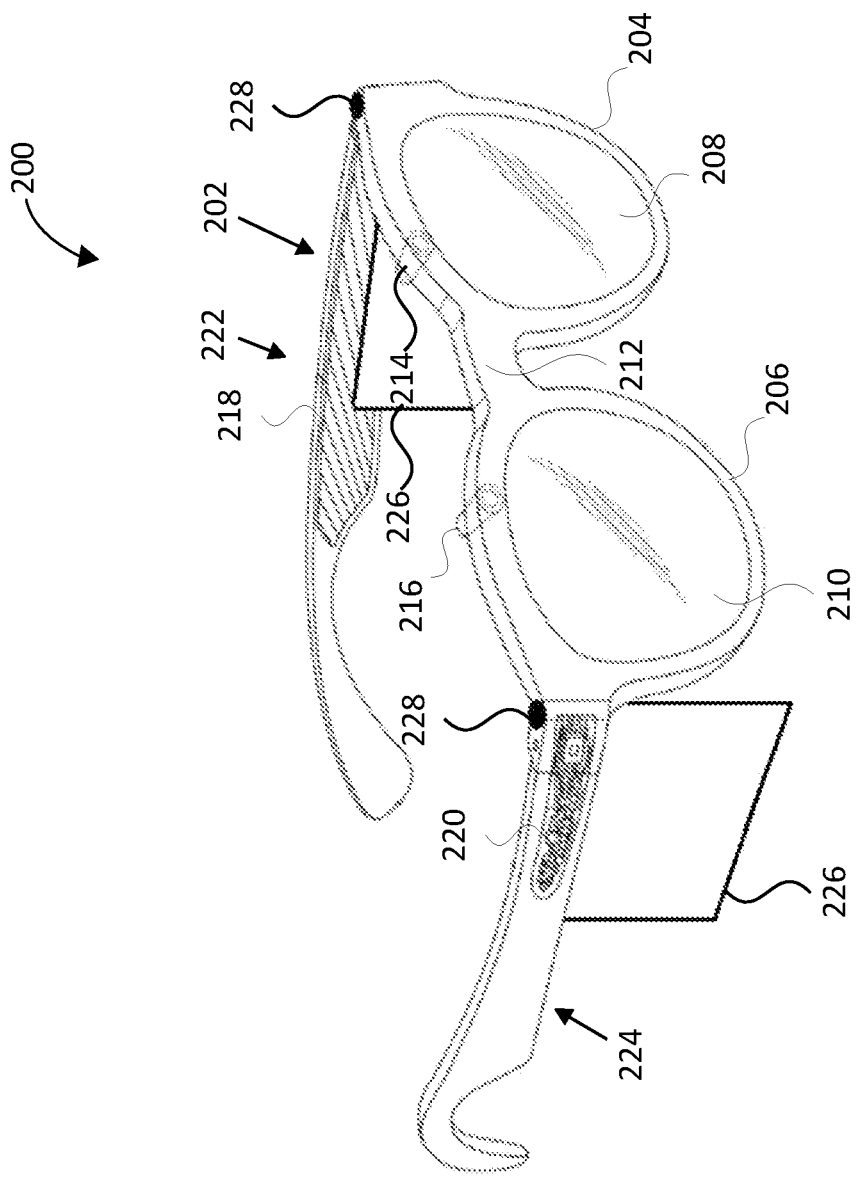
FIG. 2A is a perspective view of a head-worn device, in accordance with some example embodiments.

FIG. 2A is perspective view of a head-worn display device (e.g., glasses 200), in accordance with some examples. The glasses 200 are an example of the client device 102 of FIG. 1. The glasses 200 are capable of displaying content and are thus an example of a display device, which is referenced below. In addition, the display capabilities of the glasses 200 support AR experiences and the glasses 200 are thus an example of an AR device. As noted above, AR experiences include application of virtual content to real-world environments whether through presentation of the virtual content by transparent displays through which a real-world environment is visible or through augmenting image data to include the virtual content overlaid on real-world environments depicted therein.

The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. As discussed below, the computer 220 comprises low-power circuitry, high-speed circuitry, and a display processor. Various other examples may include these elements in different configurations or integrated together in different ways. Additional details of aspects of computer 220 may be implemented as illustrated by the data processor 302 discussed below.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide video frame data for use by the glasses 200 to extract 3D information from a real-world scene.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. Additional user input may be provided by one or more buttons 228, which in the illustrated examples are provided on the outer upper edges of the left optical element holder 204 and right optical element holder 206. The one or more touchpads 226 and buttons 228 provide a means whereby the glasses 200 can receive input from a user of the glasses 200.

Figure 2B:
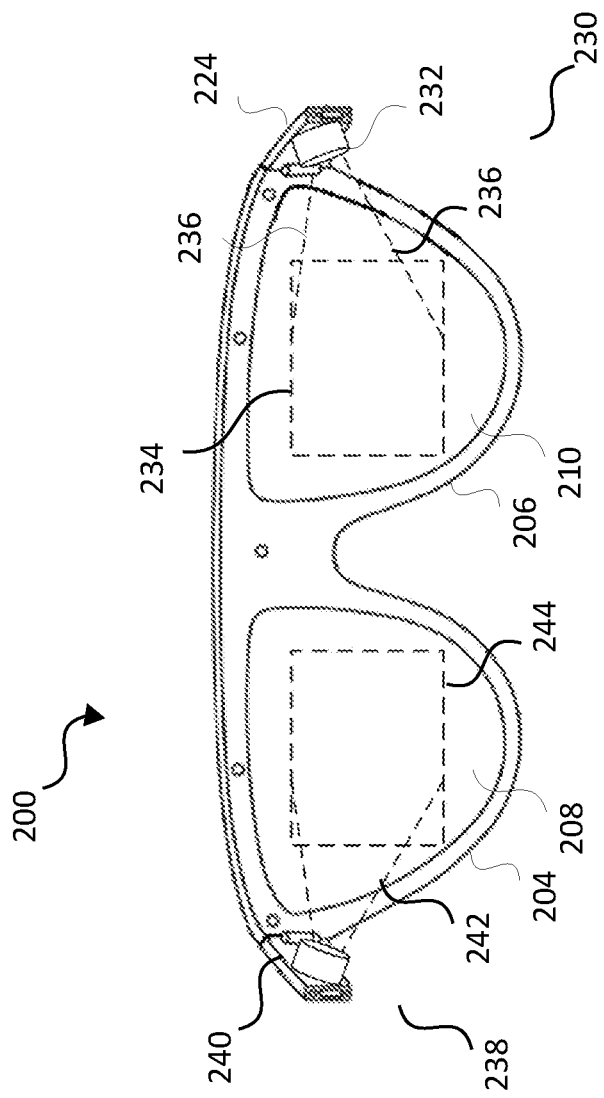
FIG. 2B illustrates a further view of the head-worn device of FIG. 2A, in accordance with some example embodiments.

FIG. 2B illustrates the glasses 200 from the perspective of a user. For clarity, a number of the elements shown in FIG. 2A have been omitted. As described in FIG. 2A, the glasses 200 shown in FIG. 2B include left optical element 208 and right optical element 210 secured within the left optical element holder 204 and the right optical element holder 206 respectively.

The glasses 200 include forward optical assembly 230 comprising a right projector 232 and a right near eye display 234, and a forward optical assembly 238 including a left projector 240 and a left near eye display 244.

In some examples, the near eye displays are waveguides. The waveguides include reflective or diffractive structures (e.g., gratings and/or optical elements such as mirrors, lenses, or prisms). Light 236 emitted by the projector 232 encounters the diffractive structures of the waveguide of the near eye display 234, which directs the light towards the right eye of a user to provide an image on or in the right optical element 210 that overlays the view of the real world seen by the user. Similarly, light 242 emitted by the projector 240 encounters the diffractive structures of the waveguide of the near eye display 244, which directs the light towards the left eye of a user to provide an image on or in the left optical element 208 that overlays the view of the real world seen by the user. The combination of a GPU, the forward optical assembly 230, the left optical element 208, and the right optical element 210 provide an optical engine of the glasses 200. The glasses 200 use the optical engine to generate an overlay of the real world view of the user including display of a 3D user interface to the user of the glasses 200.

It will be appreciated however that other display technologies or configurations may be utilized within an optical engine to display an image to a user in the user's field of view. For example, instead of a projector 232 and a waveguide, an LCD, LED or other display panel or surface may be provided.

In use, a user of the glasses 200 will be presented with information, content and various 3D user interfaces on the near eye displays. As described in more detail herein, the user can then interact with the glasses 200 using a touchpad 226 and/or the buttons 228, voice inputs or touch inputs on an associated device (e.g. client device 328 illustrated in FIG. 3), and/or hand movements, locations, and positions detected by the glasses 200.

Figure 3:
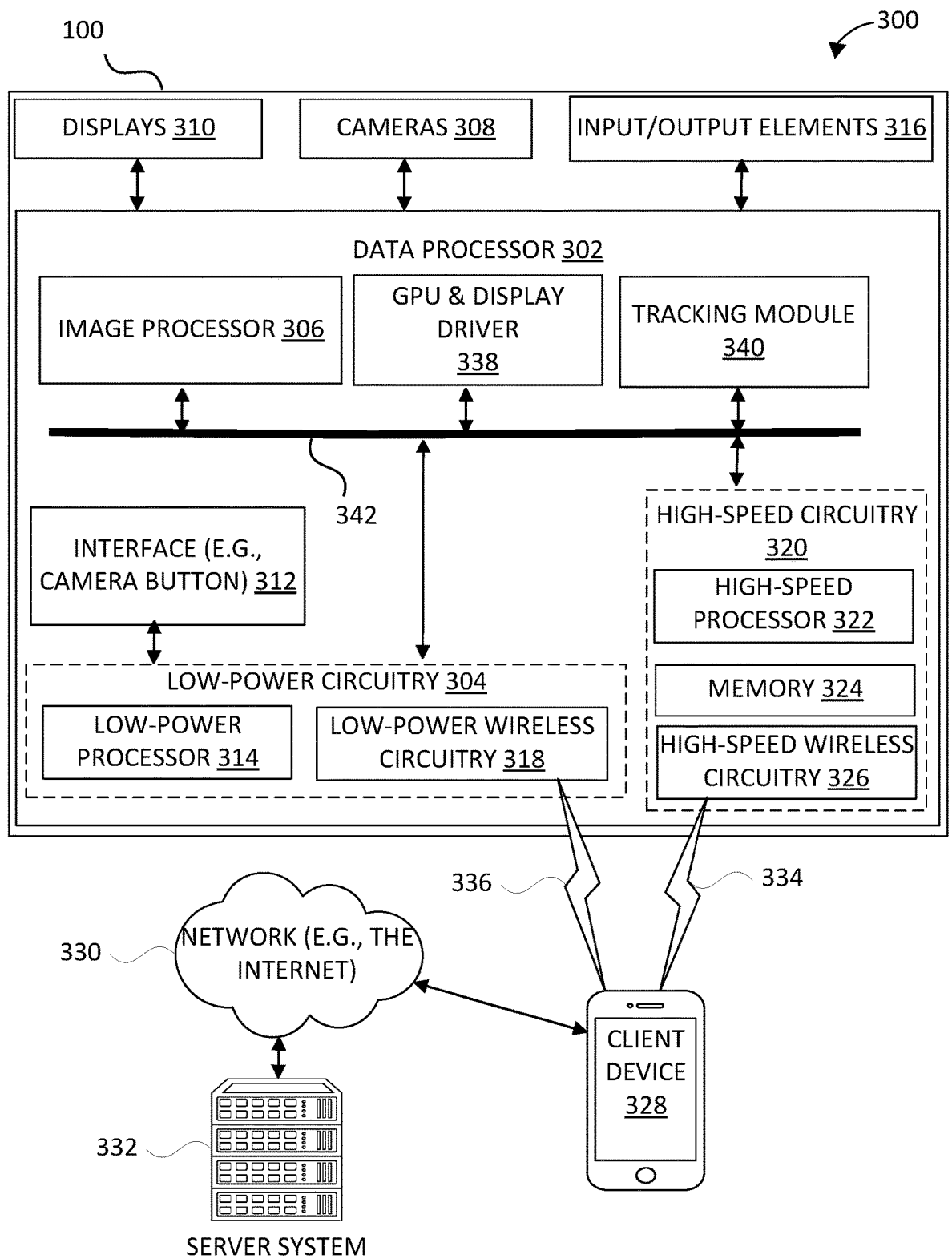
FIG. 3 is a block diagram illustrating aspects of the wearable device, according to some example embodiments.

FIG. 3 is a block diagram illustrating a networked system 300 including details of the glasses 200, in accordance with some examples. The networked system 300 includes the glasses 200, a client device 328, and a server system 332. The client device 328 may be a smartphone, tablet, phablet, laptop computer, access point, or any other such device capable of connecting with the glasses 200 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 1006 or the machine 1100 described in FIG. 9 and FIG. 10 respectively.

The glasses 200 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 9 and FIG. 10. For example, the input/output elements 316 may include any of I/O components 1118 including output components 1126, motion components 1134, and so forth. Examples of the displays 310 are discussed in FIG. 2B. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 200. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system such as the operating system 1002 of FIG. 10. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent standalone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 200. For example, the tracking module 340 uses image data and corresponding inertial data from the cameras 308 and the position components 1138, as well as GPS data, to track a location and determine a pose of the glasses 200 relative to a frame of reference (e.g., real-world environment). The tracking module 340 continually gathers and uses updated sensor data describing movements of the glasses 200 to determine updated three-dimensional poses of the glasses 200 that indicate changes in the relative position and orientation relative to physical objects in the real-world environment. The tracking module 340 permits visual placement of virtual objects relative to physical objects by the glasses 200 within the field of view of the user via the displays 310.

The GPU & display driver 338 may use the pose of the glasses 200 to generate frames of virtual content or other content to be presented on the displays 310 when the glasses 200 are functioning in a traditional augmented reality mode. In this mode, the GPU & display driver 338 generates updated frames of virtual content based on updated three-dimensional poses of the glasses 200, which reflect changes in the position and orientation of the user in relation to physical objects in the user's real-world environment.

One or more functions or operations described herein may also be performed in an application resident on the glasses 200 or on the client device 328, or on a remote server. The glasses 200 may be a stand-alone client device that is capable of independent operation or may be a companion device that works with a primary device to offload intensive processing and/or exchange data over the network 106 with the presentation server system 108. The glasses 200 may also be communicatively coupled with a companion device such as a smart watch and may be configured to exchange data with the companion device. The glasses 200 may further include various components common to mobile electronic devices such as smart glasses or smart phones (for example, including a display controller for controlling display of visual media on a display mechanism incorporated in the device).

Figure 4:
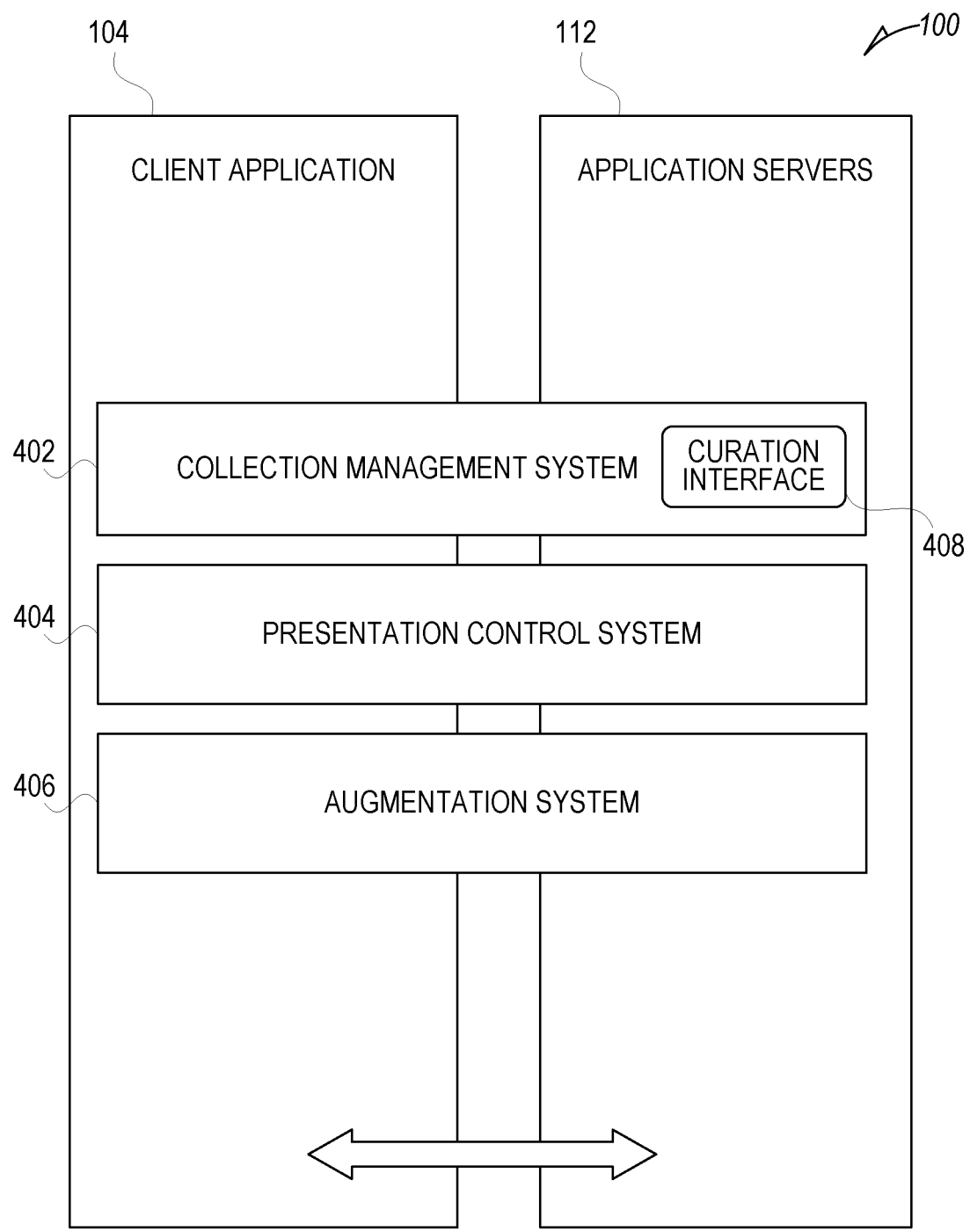
FIG. 4 is a diagrammatic representation of a presentation system, in accordance with some examples, that has both client-side and server-side functionality.

FIG. 4 is a block diagram illustrating further details regarding the volumetric content presentation system 100, according to some examples. Specifically, the volumetric content presentation system 100 is shown to comprise the presentation client application 104 and the application servers 112. The volumetric content presentation system 100 embodies a number of subsystems, which are supported on the client-side by the presentation client application 104 and on the sever-side by the application servers 112. These subsystems include, for example, a collection management system 402, a presentation control system 404, and an augmentation system 406.

The collection management system 402 is responsible for managing sets or collections of content (e.g., collections of text, image, video, and audio data). A collection of content may be organized into an "event gallery" or an "event story." Such a collection may be made available for a specified time period, such as the duration of an event to which the content relates. For example, content relating to a music concert may be made available as a "story" for the duration of that music concert. The collection management system 402 may also be responsible for publishing an icon that provides notification of the existence of a particular collection to the user interface of the presentation client application 104.

The collection management system 402 furthermore includes a curation interface 408 that allows a collection manager to manage and curate a particular collection of content. For example, the curation interface 408 enables an event organizer to curate a collection of content relating to a specific event (e.g., delete inappropriate content or redundant messages). Additionally, the collection management system 402 employs machine vision (or image recognition technology) and content rules to automatically curate a content collection.

The presentation control system 404 is responsible for facilitating and controlling volumetric content presentation. As such, the presentation control system 404 provides a mechanism that allows users to specify control operations for controlling volumetric content presentation. Control operations may, for example, include: a stop operation to stop the presentation; a pause operation to pause the presentation; a fast-forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow-motion presentation of the volumetric video).

For some embodiments, a user may specify input indicative of a control operation for controlling presentation of volumetric content by providing one or more inputs via one or more I/O components (examples of which are described in further detail below in reference to FIG. 10). For some embodiments, the presentation control system 404 may provide an interactive control interface comprising one or more interactive elements (e.g., virtual buttons) to trigger a control operation and the presentation control system 404 monitors interaction with the interactive interface to detect input indicative of a control operation. For some embodiments, a user may trigger a control operation using a gesture such as a hand or head gesture that can be associated with a specific control operation.

The augmentation system 406 provides various functions that enable a user to augment (e.g., annotate or otherwise modify or edit) media content. For example, the augmentation system 406 provides functions related to the generation, publication, and application of augmentation data such as media overlays (e.g., image filters) to volumetric content. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The augmentation system 406 operatively supplies one or more media overlays to the presentation client application 104 based on a geolocation of the client device 102 or based on other information, such as social network information of the user of the client device 102. The media overlays may be stored in the database 120 and accessed through the database server 118.

Filters are an example of media overlays that are displayed as overlaid on an image or video during presentation to a user. Filters may be of various types, including user-selected filters from a set of filters presented to a user by the presentation client application 104. Other types of filters include geolocation filters (also known as geo-filters), which may be presented to a user based on geographic location. For example, geolocation filters specific to a neighborhood or special location may be presented within a user interface by the presentation client application 104, based on geolocation information determined by a Global Positioning System (GPS) unit of the client device 102.

Another type of filter is a data filter, which may be selectively presented to a user by the presentation client application 104, based on other inputs or information gathered by the client device 102. Examples of data filters include current temperature at a specific location, a current speed at which a sending user is traveling, battery life for a client device 102, or the current time.

AR content items are another example of media overlays. An AR content item may be a real-time special effect and/or sound that can be added to an image or a video including volumetric images and videos.

Generally, AR content items, overlays, image transformations, images, and similar terms refer to modifications that may be applied to image data (e.g., videos or images) including volumetric content. This includes real-time modifications, which modify an image as it is captured using device sensors (e.g., one or multiple cameras) of a client device 102 and then displayed by a display device of the client device 102 (e.g., an embedded display of the client device) with the modifications. This also includes modifications to stored content, such as volumetric videos in a gallery or collection that may be modified. For example, in a client device 102 with access to multiple AR content items, a user can use a single volumetric video with multiple AR content items to see how the different AR content items will modify the stored content. For example, multiple augmented reality content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such augmentation systems to modify content using augmentation data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, volumetric videos, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be augmented (e.g., edited), elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh can be used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

The augmentation system 406 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a machine learning model that has been configured to execute efficiently on the client device 102. In some examples, a computer animation model to transform video and image content can be used by the augmentation system 406 where a neural network operates as part of a presentation client application 104 operating on the client device 102.

The machine learning model can be trained using labeled or unlabeled training data that includes ground-truth information. For example, one or more images depicting a partial and/or whole body of a person can be included in the training data along with the ground-truth segmentation information defining the current positions of limbs and joins of the whole body of the user (e.g., position of arms, torso, legs, head, shoulders, and so forth). The machine learning model can be applied to a subset of the training data, such as one or more images in the training data and can generate an estimate or prediction about the ground-truth segmentation information defining the current positions of limbs and joins of the whole body of the user (e.g., position of arms, torso, legs, head, shoulders, and so forth). The estimate or prediction can be compared with the corresponding ground-truth information to compute a deviation. The deviation can then be used to update one or more parameters of the machine learning model. After updating the one or more parameters, the machine learning model is applied to another subset of the training data and these operations are repeated until a stopping criterion is reached.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example.

The machine-learning algorithms use the training data to find correlations among the identified features that affect the outcome or assessment. In some examples, the training data includes labeled data, which is known data for one or more identified features and one or more outcomes, such as detecting communication patterns, detecting the meaning of the message, generating a summary of a message, detecting action items in messages detecting urgency in the message, detecting a relationship of the user to the sender, calculating score attributes, calculating message scores, etc.

With the training data and the identified features, the machine-learning tool is trained at machine-learning program training. The machine-learning tool appraises the value of the features as they correlate to the training data. The result of the training is the trained machine-learning program.

When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised learning, unsupervised or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing query data to generate outcomes or predictions, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as individual measurable property of a process, article, system, or phenomenon represented by a data set (e.g., the training data).

In training phases, the machine-learning program uses the training data to find correlations among the features that affect a predicted outcome or assessment.

With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a deep neural network that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

During prediction phases, the trained machine-learning program is used to perform an assessment. Query data is provided as an input to the trained machine-learning program, and the trained machine-learning program, generates the assessment as output, responsive to receipt of the query data.

Figure 5:
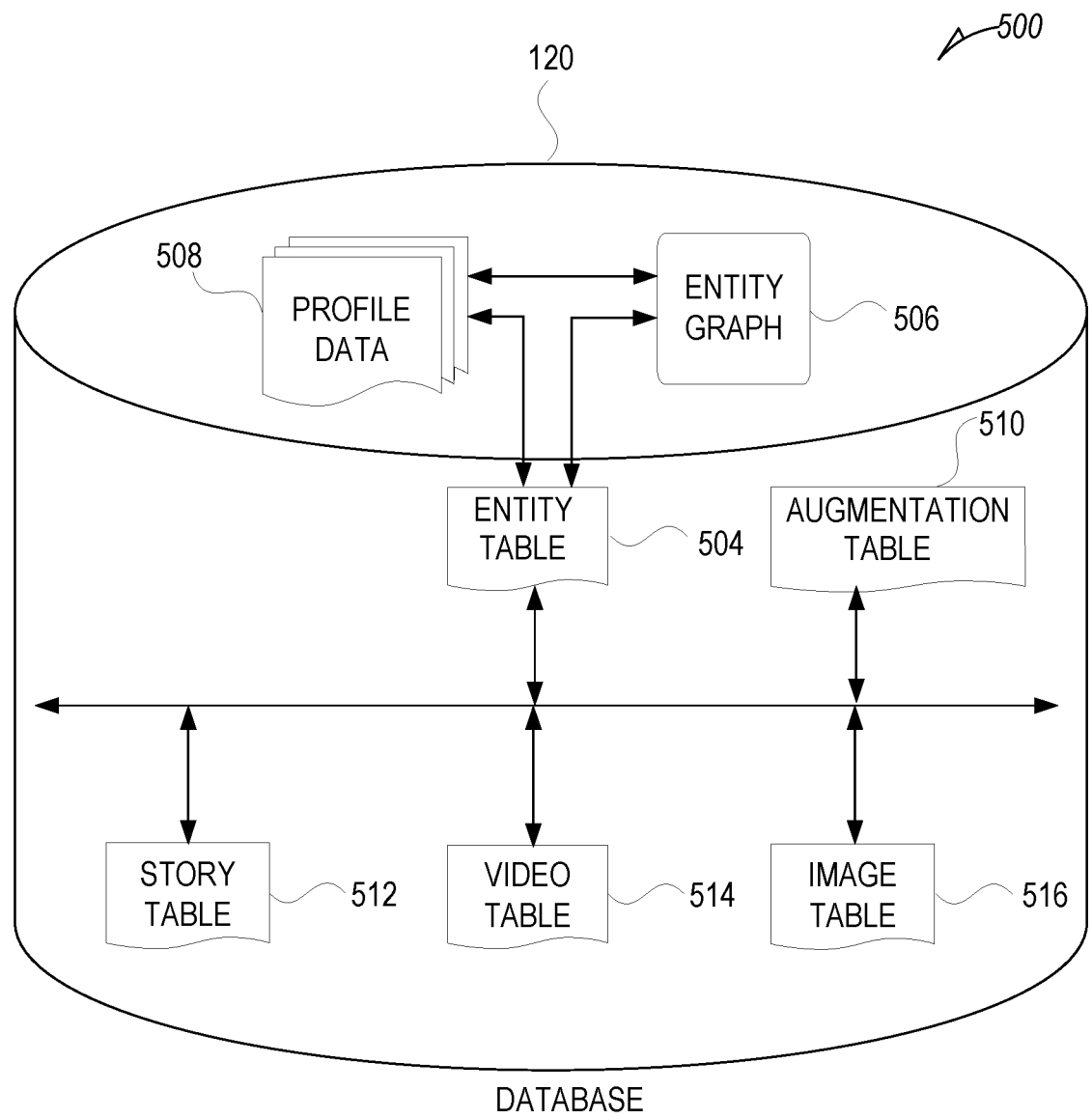
FIG. 5 is a diagrammatic representation of a data structure as maintained in a database, in accordance with some examples.

FIG. 5 is a diagrammatic representation of a data structure 500 as maintained in the database 120, in accordance with some examples. While the content of the database 120 is shown to comprise a number of tables, it will be appreciated that the data could be stored in other types of data structures (e.g., as an object-oriented database).

An entity table 504 stores entity data, and is linked (e.g., referentially) to an entity graph 506 and profile data 508. Entities for which records are maintained within the entity table 504 may include individuals, corporate entities, organizations, objects, places, events, and so forth. Regardless of entity type, any entity regarding which the presentation server system 108 stores data may be a recognized entity. Each entity is provided with a unique identifier, as well as an entity type identifier (not shown).

The entity graph 506 stores information regarding relationships and associations between entities. Such relationships may be social, professional (e.g., work at a common corporation or organization) interested-based or activity-based, merely for example.

The profile data 508 stores multiple types of profile data about a particular entity. The profile data 508 may be selectively used and presented to other users of the volumetric content presentation system 100, based on privacy settings specified by a particular entity. Where the entity is an individual, the profile data 508 includes, for example, a user name, telephone number, address, settings (e.g., notification and privacy settings), as well as a user-selected avatar representation (or collection of such avatar representations).

The database 120 also stores augmentation data, such as overlays including AR content items and filters, in an augmentation table 510. The augmentation data is associated with and applied to videos (for which data is stored in a video table 514) and images (for which data is stored in an image table 516) including volumetric videos and images.

A story table 512 stores data regarding collections of messages and associated image, video, or audio data, which are compiled into a collection (e.g., a story or a gallery). The creation of a particular collection may be initiated by a particular user (e.g., each user for which a record is maintained in the entity table 504). A user may create a "personal story" in the form of a collection of content that has been created and sent/broadcast by that user. To this end, the user interface of the presentation client application 104 may include an icon that is user-selectable to enable a sending user to add specific content to his or her personal story.

The entity table 504 may associate various augmentations from the augmentation table 510 with various images and videos stored in the image table 516 and the video table 514.

Figure 6:
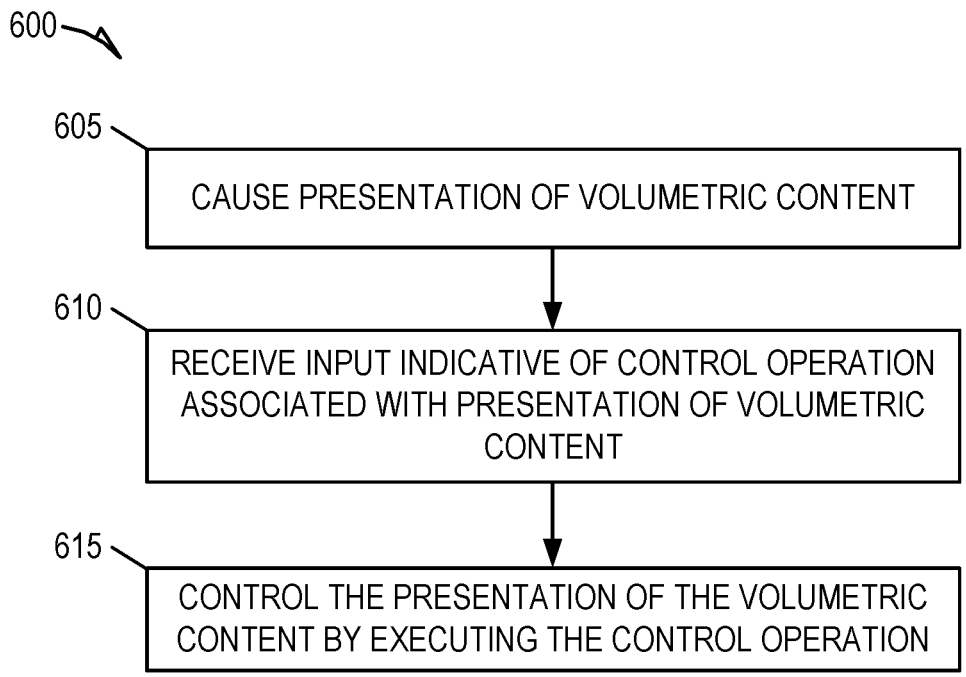
FIGS. 6 and 7 are flowcharts illustrating operations of the volumetric content presentation system in performing a method for controlling presentation of volumetric content, according to example embodiments.
Figure 7:
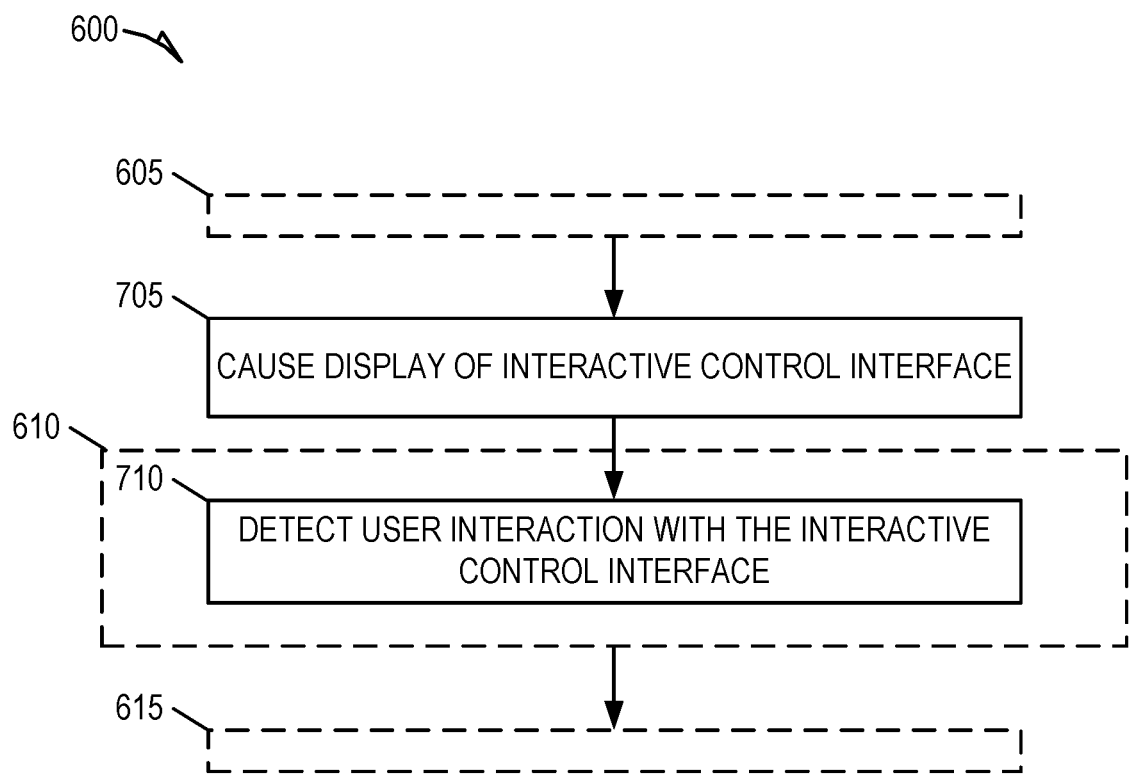

FIGS. 6 and 7 are flowcharts illustrating operations of the volumetric content presentation system in performing a method 600 for presenting a volumetric video, according to example embodiments. The method 600 may be embodied in computer-readable instructions for execution by one or more processors such that the operations of the method 600 may be performed in part or in whole by the functional components of the volumetric content presentation system 100; accordingly, the method 600 is described below by way of example with reference thereto. However, it shall be appreciated that at least some of the operations of the method 600 may be deployed on various other hardware configurations than the volumetric content presentation system 100.

At operation 605, the volumetric content presentation system 100 causes presentation of volumetric content by a display device. The volumetric content comprises a volumetric video that includes a volumetric representation of one or more three-dimensional elements of a three-dimensional space. That is, the volumetric representation includes at least one content item (e.g., an AR content item) corresponding to a person or object in the three-dimensional space. For some embodiments, the display device is an augmented reality device (e.g., the glasses 200) and the presentation of the volumetric content may include displaying one or more AR content items overlaid upon a real-world space that is visible to a user of the display device, which may be the same as the three-dimensional space in which the volumetric video was captured or a different space. The real-world space may be visible to the user through a transparent portion of the display device or from image data presented by the display device. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. The location and movement of the user may be tracked based on data from motion and position components (examples of which are described in further detail below in reference to FIG. 10) of any one or more of the display device, a primary device to which the display device is a complementary device thereof, or a complementary device (e.g., a smart watch) in communication with the display device.

The volumetric content may further include audio data comprising one or more audio signals, and as such, the presentation of the volumetric content can include presenting one or more audio signals.

At operation 610, the volumetric content presentation system 100 receives input indicative of a control operation associated with presentation of the volumetric video. The control operation may, for example, comprise: a stop operation to stop the presentation; a pause operation to pause the presentation; a fast forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow motion presentation of the volumetric video).

For some embodiments, the input corresponds to input received from one or more I/O components (examples of which are described in further detail below in reference to FIG. 10) of any one or more of the display device, a primary device to which the display device is a complementary device thereof, or a complementary device (e.g., earphones) in communication with the display device. Consistent with these embodiments, the receiving of the input indicative of the control operation may comprise receiving one or more input signals based on user interaction with one or more I/O components.

For some embodiments, the presentation of the volumetric video may include an interactive control interface comprising one or more interactive elements (e.g., virtual buttons) to trigger a control operation and receiving the input may comprise detecting an interaction by a user of the display device with the interactive element of the interactive interface.

For some embodiments, receiving the input indicative of the control operation may comprise detecting a gesture of a user of the display device. For example, a body motion of the user, such as a hand or head gesture, can be associated with a control operation and used by the user to trigger the control operation. Detecting a gesture of a user may, for example, include performing image processing on image data produced by a camera that is communicatively coupled to the display device (e.g., camera 216 of glasses 200). Performing image processing to detect hand gestures may include utilizing one or more machine learning models.

For some embodiments, receiving the input indicative of the control operation may comprise detecting an interaction of a user with a content item within the volumetric video such as a representation of a person or an object. Detecting the interaction may include detecting a gesture of the user directed at the virtual content item, detecting a gaze of the user being directed at the virtual content item, detecting a motion or movement of the user in a direction of the content item, or determining a distance between the tracked location of the user and a location of the virtual content item within the volumetric representation of the three-dimensional space satisfies a threshold distance constraint.

At operation 615, the volumetric content presentation system 100 controls the presentation of the volumetric content by the display device by executing the control operation. Depending on the control operation, executing the control operation may comprise any one of: stopping the presentation of the volumetric video; pausing the presentation of the volumetric video; rewinding the presentation of the volumetric video; fast forwarding the presentation of the volumetric video; increasing a zoom level of the presentation of the volumetric video; decreasing the zoom level of the presentation of the volumetric video; increasing the playback speed of the presentation of the volumetric video; and decreasing the playback speed of the presentation of the volumetric video. As part of controlling presentation of the volumetric content, the volumetric content presentation system allows a user to move around the three-dimensional space of the volumetric content to observe the execution of the control operation on the presentation of the volumetric content from multiple perspectives. That is, while a control operation is being executed, the volumetric content presentation system 100 causes the display device to present one or more volumetric representations of elements, in accordance with the control operation, from multiple perspectives depending on a determined position of a user in the three-dimensional space based, for example, on a location of the user in their real-world environment. For example, while the presentation of the volumetric content is paused, a user may move around to observe the volumetric representation of an element in the volumetric content from multiple perspectives while motion of the element is frozen.

As shown in FIG. 7, the method 600 can, in some embodiments, further include operations 705 and 710. Consistent with these embodiments, the operation 705 can be performed prior to operation 610 where the volumetric content presentation system 100 receives input indicative of the control operation. At operation 705, the volumetric content presentation system 100 causes the display device to display an interactive control interface for controlling the presentation of the volumetric video. The interactive control interface comprises one or more interactive elements (e.g., buttons) to trigger a control operation.

Consistent with these embodiments, the operation 710 may be performed as part of the operation 610. At operation 710, the volumetric content presentation system 100 detects an interaction by a user of the display device with an interactive element of the interactive interface corresponding to the control operation.

Figure 8:
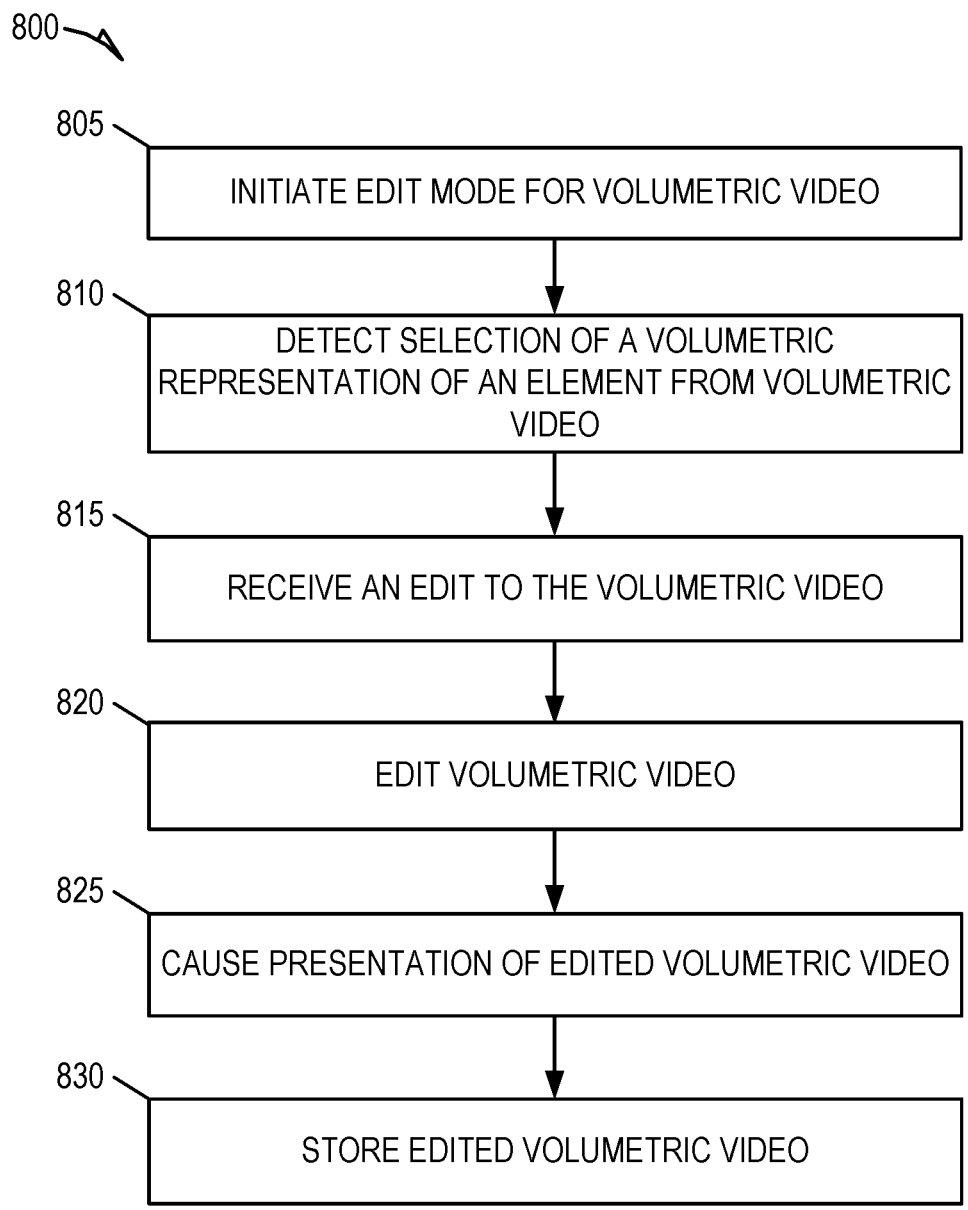
FIG. 8 is a flowchart illustrating operations of the volumetric content presentation system in performing a method for editing presentation of a volumetric content, according to example embodiments.

FIG. 8 is a flowchart illustrating operations of the volumetric content presentation system 100 in performing a method 800 for editing presentation of volumetric content, according to example embodiments. The method 800 may be embodied in computer-readable instructions for execution by one or more processors such that the operations of the method 800 may be performed in part or in whole by the functional components of the volumetric content presentation system 100; accordingly, the method 800 is described below by way of example with reference thereto. However, it shall be appreciated that at least some of the operations of the method 800 may be deployed on various other hardware configurations than the volumetric content presentation system 100.

For some embodiments, the operations of the method 800 can be performed as part of the method 600. For example, the operations of the method 800 can be performed at any time subsequent to the operation 605 where the volumetric content presentation system 100 causes presentation of the volumetric content, including after controlling presentation of the volumetric content according to a control operation specified by detected input.

At operation 805, the volumetric content presentation system 100 initiates an edit mode associated with the presentation of the volumetric video. While in edit mode, a user can modify aspects of the presentation of the volumetric content and generate modified volumetric content for subsequent presentation. That is, edit mode allows the user to temporarily modify how the volumetric content is presented as well as create and save modifications that can be presented at a later time. The volumetric content presentation system 100 initiates the edit mode in response to user input indicative of a request to initiate the edit mode (e.g., input received from an I/O component of the display device, a primary device to which the display device is a companion, or a companion device of the display device).

For some embodiments, in initiating the edit mode, the volumetric content presentation system 100 causes the display device to display an interactive editing interface for editing the volumetric video. As such, the interactive editing interface includes one or more interactive elements (e.g., buttons, toggles, switches, drop-down menus, and the like) to provide edits to the volumetric video.

For some embodiments, the method 800 includes operation 810 where the volumetric content presentation system 100 detects user selection of a volumetric representation of an element from the volumetric content (e.g., an AR content item), at operation 810. Detecting user selection of the element can include detecting a user interaction with an AR content item included in the presentation of the volumetric content. Detecting the interaction may include detecting a gesture of the user directed at the virtual content item, detecting a gaze of the user being directed at the virtual content item, or determining a distance between the tracked location of the user and a location of the virtual content item within the volumetric representation of the three-dimensional space satisfies a threshold distance constraint.

At operation 815, the volumetric content presentation system 100 receives an edit to the volumetric video. For some embodiments, the edit to the volumetric video may be provided by a user via the interactive editing interface. For some embodiments, the edit is directed specifically at a content item selected by the user.

The edit may comprise any one or more of: a modification to a content item (e.g., a change to a size, shape, color, shading or the like), a removal of a content item; an addition of a content item (e.g., image, video, and/or audio content); and addition of a filter to a content item or a real-world object visible to a user via the presentation of the volumetric content such as by application of a filter. A content item or augmentation to be added to the volumetric video may be selected from a library or may be selected from another volumetric video. When the edit includes the addition of a content item, the edit may further specify aspects such as a position and orientation of the content item within the three-dimensional space of the volumetric video. The edit may further specify configurable characteristics of the content item such as size, shape, color, shading, movement, or the like.

At operation 820, the volumetric content presentation system 100 edits the volumetric video based on the edit, which results in an edited volumetric video. In editing the volumetric video, the volumetric content presentation system 100 modifies the volumetric content based on the edit thereby resulting in modified volumetric content. Depending on the nature of the edit, the volumetric content presentation system 100 may edit the volumetric video by performing any one or more of: modifying an content item in the three-dimensional space (e.g., by changing a size, shape, color, shading or the like), removing a content item in the three-dimensional space; adding a content item to the three-dimensional space (e.g., adding image, video, or audio content); and applying a filter to a content item in the three-dimensional space or real-world object that is visible within the presentation of the volumetric content. In an example, the volumetric video includes volumetric representations of elements of a basketball game including at least a basketball and the edit includes a filter to apply to the volumetric representation of the basketball to make the basketball appear to glow.

At operation 825, the volumetric content presentation system 100 causes presentation of the edited volumetric video by the display device. Returning to the example of the basketball game, the presentation of the edited volumetric video includes a presentation of a glowing volumetric representation of the basketball based on the filter included in the edit. Presentation of the glowing volumetric representation of the basketball game makes the presentation of the volumetric video more engaging and immersive.

For some embodiments, the user of the display device may be provided the option to save the edited volumetric video, and in response to receiving input indicative of a request to save the edited volumetric video, the volumetric content presentation system 100 stores the modified volumetric content in the database 120, at operation 830.

Figure 9:
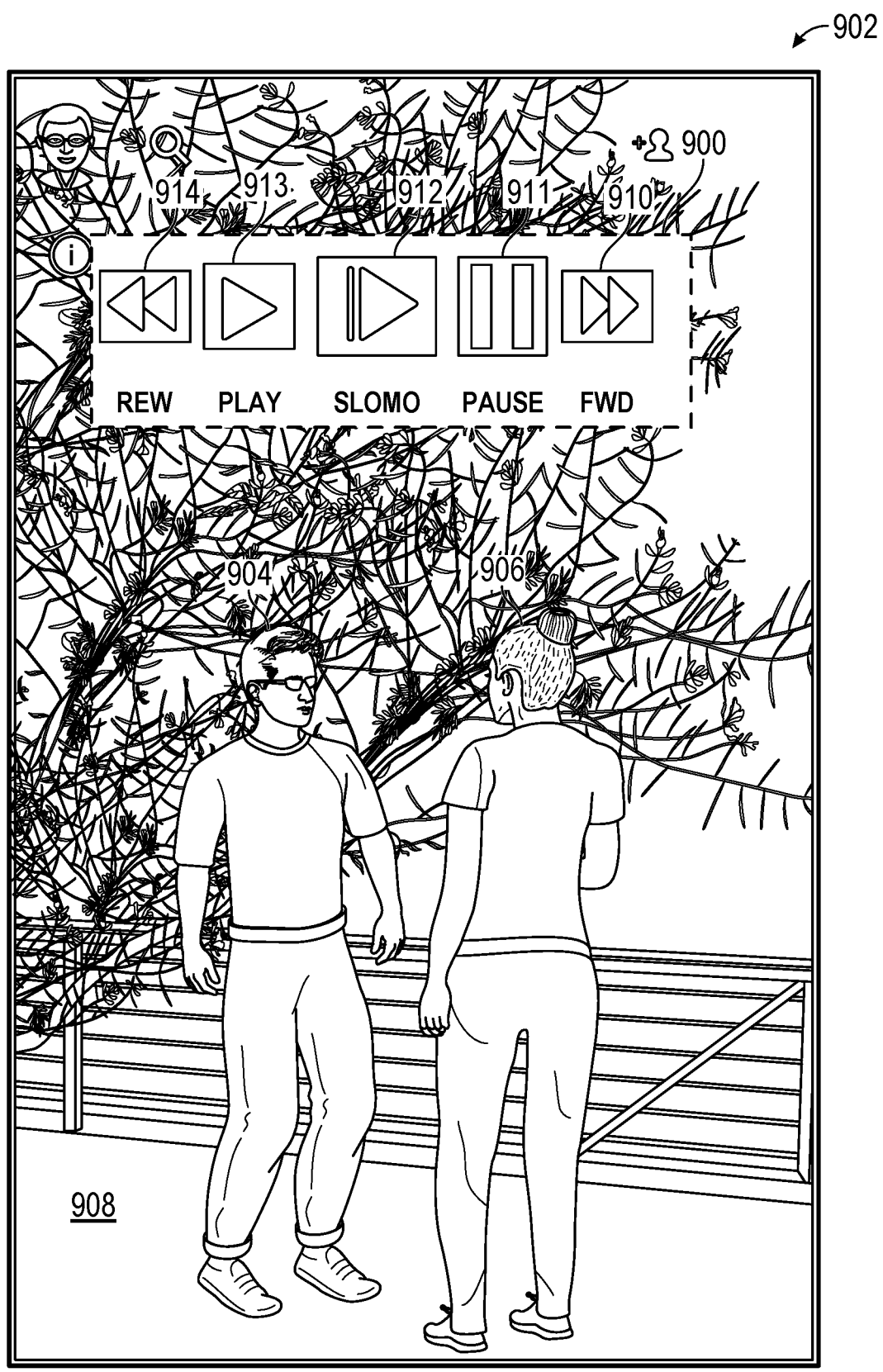
FIG. 9 is a conceptual diagram illustrating an example interactive control interface for controlling presentation of volumetric content, according to example embodiments.

FIG. 9 is a conceptual diagram illustrating an example interactive control interface 900 for controlling presentation of volumetric content within a display region 902 of a display device, according to example embodiments. As shown, the interactive control interface 900 is displayed in conjunction with the presentation of volumetric content. The volumetric content comprises a volumetric video that includes volumetric representations of two people interacting with each other. The volumetric representations are in the form of AR content items 904 and 906. As part of the presentation of the volumetric content, the AR content items 904 and 906 are displayed as an overlay on a real-world environment 908 that is visible within the display region 902 of the display device.

In this example, the interactive control interface 900 is also displayed as an overlay on the real-world environment 908. The interactive control interface 900 comprises multiple interactive elements to trigger control operations for controlling the presentation of the volumetric content. In particular, the interactive control interface 900 includes: a fast-forward element 910 to advance the presentation at a higher speed; a pause element 911 to pause the presentation; a slow-motion element 912 to reduce a speed of the presentation; a play element 913 to resume the presentation; and a rewind element 914 to rewind the presentation. Upon detecting a user interaction (e.g., a selection) of one of the elements 910-914, the volumetric content presentation system 100 controls the presentation of the volumetric video in accordance with the control operations that corresponds to the element for which the interaction was detected.

Software Architecture

Figure 10:
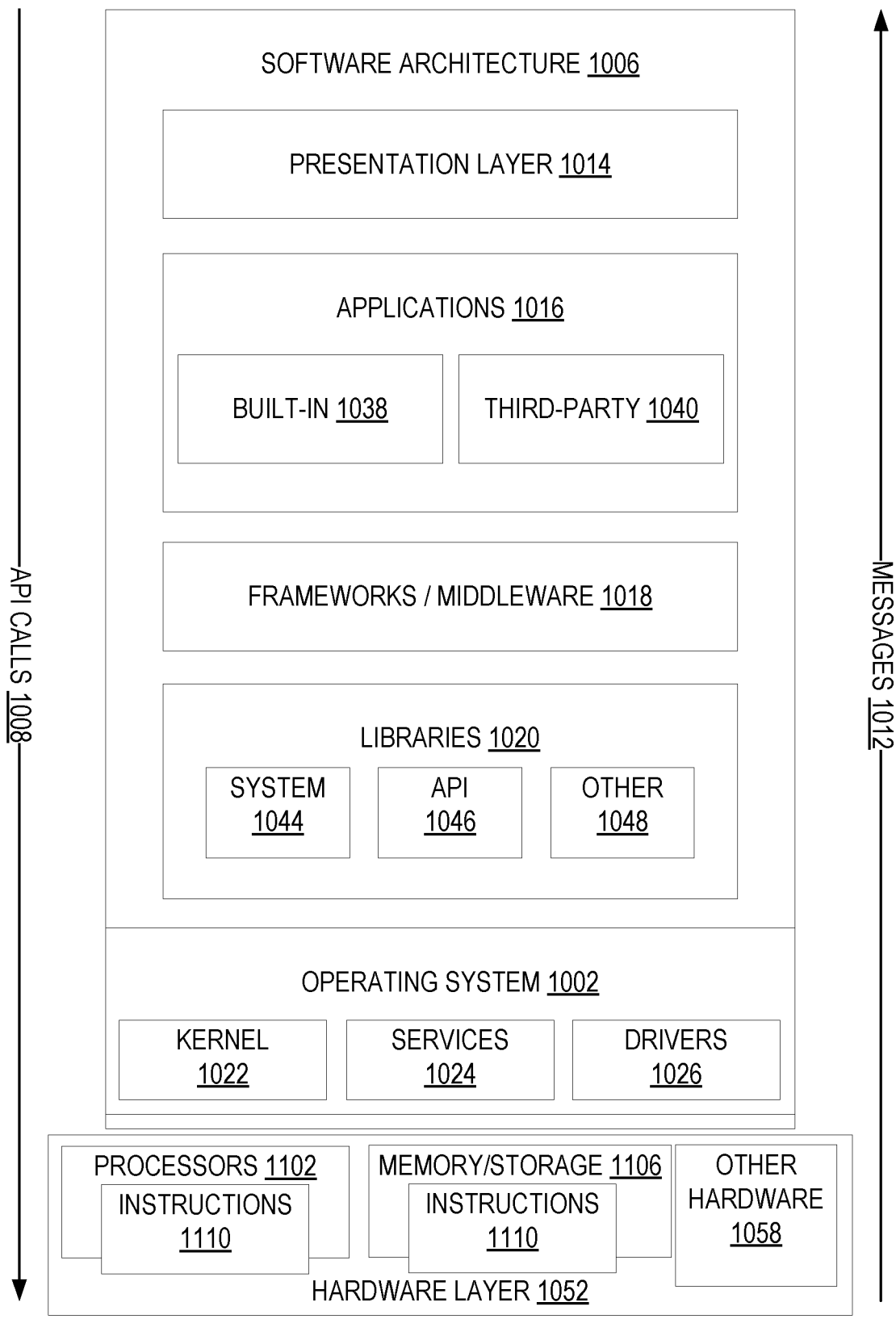
FIG. 10 is a block diagram illustrating a representative software architecture, which may be used in conjunction with various hardware architectures herein described, according to example embodiments.

FIG. 10 is a block diagram illustrating an example software architecture 1006, which may be used in conjunction with various hardware architectures herein described. FIG. 10 is a non-limiting example of a software architecture, and it will be appreciated that many other architectures may be implemented to facilitate the functionality described herein. The software architecture 1006 may execute on hardware such as a machine 1100 of FIG. 10 that includes, among other things, processors 1104, memory/storage 1106, and I/O components 1118. A representative hardware layer 1052 is illustrated and can represent, for example, the machine 1100 of FIG. 11. The representative hardware layer 1052 includes processors 1104 having associated executable instructions 1110. The executable instructions 1110 represent the executable instructions of the software architecture 1006, including implementation of the methods, components, and so forth described herein. The hardware layer 1052 also includes memory and/or storage 1106, which also have the executable instructions 1110. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive a response to the API calls 1008 as messages 1012. The layers illustrated are representative in nature and not all software architectures have all layers. For example, some mobile or special-purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various GUI functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Figure 11:
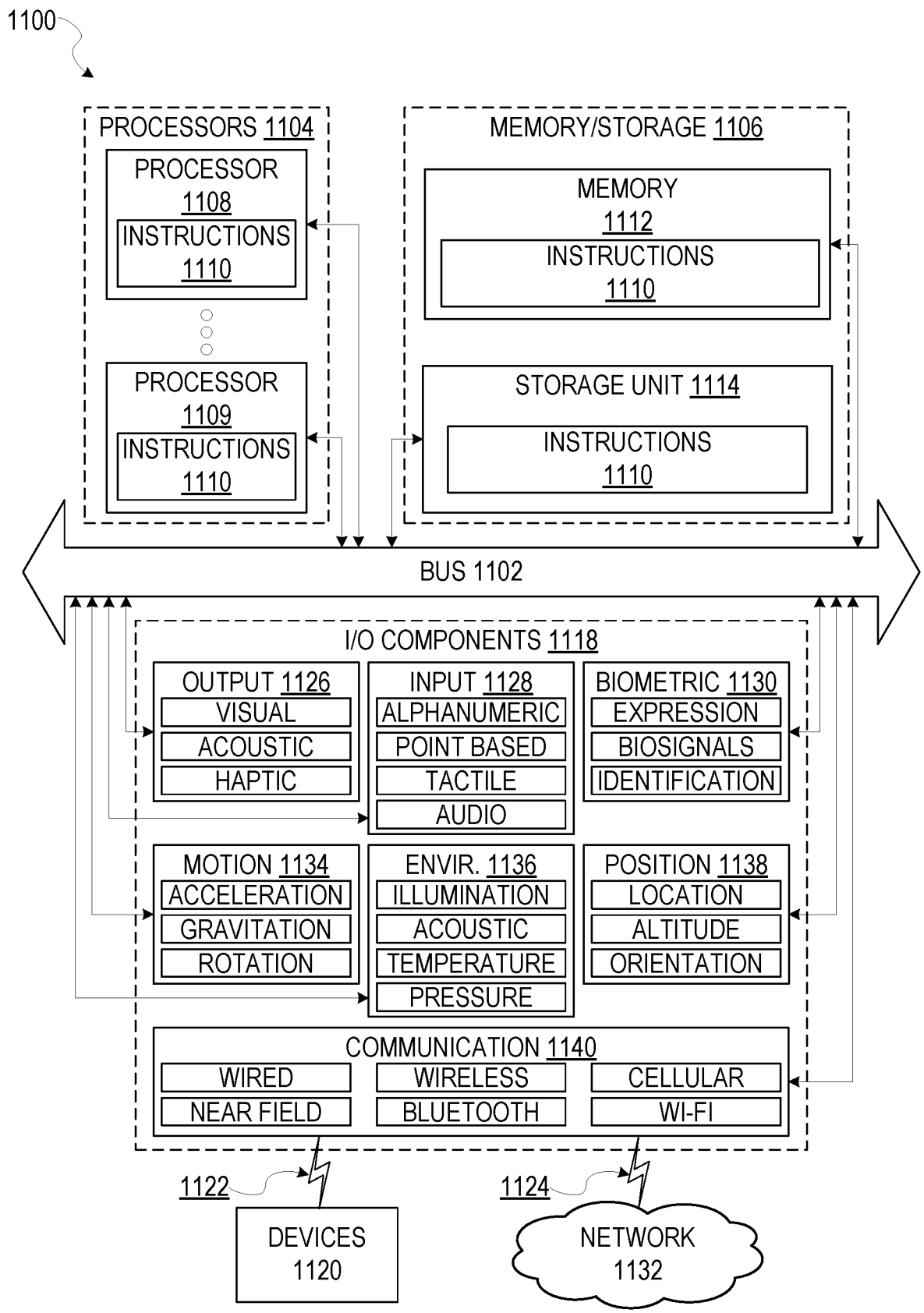
FIG. 11 is a block diagram illustrating components of a machine able to read instructions from a machine-readable medium (e.g., a machine-readable storage medium) and perform any one or more of the methodologies discussed herein, according to example embodiments.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. In an example embodiment, the processors 1104 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1108 and a processor 1109 that may execute the instructions 1110. Although FIG. 11 shows multiple processors 1104, the machine 1100 may include a single processor with a single core, a single processor with multiple cores (e.g., a multi-core processor), multiple processors with a single core, multiple processors with multiple cores, or any combination thereof.

The memory/storage 1106 may include a memory 1112, such as a main memory, or other memory storage, and a storage unit 1114, both accessible to the processors 1104 such as via the bus 1102. The storage unit 1114 and memory 1112 store the instructions 1110 embodying any one or more of the methodologies or functions described herein. The instructions 1110 may also reside, completely or partially, within the memory 1112, within the storage unit 1114, within at least one of the processors 1104 (e.g., within the processor's cache memory), or any suitable combination thereof, during execution thereof by the machine 1100. Accordingly, the memory 1112, the storage unit 1114, and the memory of the processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion, and the grouping is in no way limiting. In various example embodiments, the I/O components 1118 may include output components 1126 and input components 1128. The output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1118 may include biometric components 1130, motion components 1134, environment components 1136, or position components 1138, among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1138 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122, respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
    causing presentation, by a display device, of a volumetric content comprising a volumetric video, the volumetric video comprising a volumetric representation of one or more elements of a three-dimensional space, the causing of the presentation of the volumetric content comprising causing the display device to present the volumetric representation of the one or more elements overlaid on a real-world environment that is visible to a user of the display device, the presentation of the volumetric video comprising a display of an interactive interface comprising a set of interactive elements overlaid on the real-world environment, the set of interactive elements comprising:
        a first interactive element to pause the presentation of the volumetric video;
        a second interactive element to fast forward the presentation of the volumetric video; and a third interactive element to rewind the presentation of the volumetric video;

receiving input indicative of a control operation associated with the presentation of the volumetric content based on an interaction with an interactive element from the set of interactive elements, the control operation comprising one of: a pause operation, a fast-forward operation, or a rewind operation; and controlling the presentation of the volumetric content by the display device by executing the control operation, the controlling of the presentation of the volumetric content comprising:

tracking movement of the user of the display device within the real-world environment;

causing presentation, by the display device, of the volumetric representation of the one or more elements from multiple perspectives while the control operation is being executed based on the tracked movement of the user of the display device, the executing of the control operation comprising one of:

pausing the presentation of the volumetric video based on the input being indicative of an interaction with the first interactive element;

fast forwarding the presentation of the volumetric video based on the input being indicative of an interaction with the second interactive element; or rewinding the presentation of the volumetric video based on the input being indicative of an interaction with the third interactive element.

2. The method of claim 1, further comprising:
receiving an edit to the volumetric video;
editing the volumetric video based on the edit, the editing of the volumetric video resulting in an edited volumetric video; and
causing presentation, by the display device, of the edited volumetric video.

3. The method of claim 2, wherein receiving the edit comprises receiving input indicative of at least one or more of:
a modification of a content item included in the volumetric video;
a removal of the content item included in the volumetric video;
an addition of a new content item to the volumetric video; and
an application of a filter to the content item in the volumetric video or a real-world object that is visible as part of the presentation of the volumetric content.

4. The method of claim 3, wherein:
the volumetric video is a first volumetric video;
the receiving of the input indicative of the addition of the new content item to the first volumetric video comprises one of:
receiving a selection of the new content item from a library; and
receiving a selection of the new content item from a second volumetric video.

5. The method of claim 2, wherein editing the volumetric video comprises at least one of:
modifying a content item included in the volumetric video;
removing the content item included in the volumetric video;
adding a new content item to the volumetric video; and
applying a filter to the content item in the volumetric video or a real-world object that is visible as part of the presentation of the volumetric content.

6. The method of claim 2, further comprising:
detecting a selection of a content item from the presentation of the volumetric content, wherein the edit corresponds to the content item.

7. The method of claim 2, further comprising:
causing display of an editing interface within the presentation of the volumetric video, wherein receiving the edit comprising detecting user interaction with the editing interface.

8. The method of claim 1, wherein the receiving of the input comprises detecting a gesture by a user of the display device.

9. The method of claim 1, wherein:
the receiving of the input comprises detecting the interaction by a user of the display device with one of the interactive elements of the interactive interface.

10. The method of claim 1, wherein the control operation further comprises one of:
a stop operation, zoom-in operation, a zoom-out operation, and a playback speed modification.

11. The method of claim 1, wherein controlling the presentation of the volumetric content by the display device in accordance with the control operation further comprises one of:
stopping the presentation of the volumetric video;
increasing a zoom level of the presentation of the volumetric video;
decreasing the zoom level of the presentation of the volumetric video;
increasing a playback speed of the presentation of the volumetric video; or
decreasing the playback speed of the presentation of the volumetric video.

12. A system comprising:
one or more hardware processors; and
at least one memory storing instructions that cause the one or more hardware processors to perform operations comprising:
causing presentation, by a display device, of a volumetric content comprising a volumetric video, the volumetric video comprising a volumetric representation of one or more elements of a three-dimensional space, the causing of the presentation of the volumetric content comprising causing the display device to present the volumetric representation of the one or more elements overlaid on a real-world environment that is visible to a user of the display device, the presentation of the volumetric video comprising a display of an interactive interface comprising a set of interactive elements overlaid on the real-world environment, the set of interactive elements comprising:
a first interactive element to pause the presentation of the volumetric video;
a second interactive element to fast forward the presentation of the volumetric video; and
a third interactive element to rewind the presentation of the volumetric video;
receiving input indicative of a control operation associated with the presentation of the volumetric content, the control operation comprising one of:
a pause operation, a fast-forward operation, or a rewind operation; and
controlling the presentation of the volumetric content by the display device by executing the control operation, the controlling of the presentation of the volumetric content comprising:

tracking movement of the user of the display device within the real-world environment;
causing presentation, by the display device, of the volumetric representation of the one or more elements from multiple perspectives while the control operation is being executed based on the tracked movement of the user of the display device, the executing of the control operation comprising one of:
pausing the presentation of the volumetric video based on the input being indicative of an interaction with the first interactive element;
fast forwarding the presentation of the volumetric video based on the input being indicative of an interaction with the second interactive element; or
rewinding the presentation of the volumetric video based on the input being indicative of an interaction with the third interactive element.

13. The system of claim 12, further comprising:
receiving an edit to the volumetric video;
editing the volumetric video based on the edit, the editing of the volumetric video resulting in an edited volumetric video; and
causing presentation, by the display device, of the edited volumetric video.

14. The system of claim 13, wherein receiving the edit comprises receiving input indicative of at least one or more of:
a modification of a content item included in the volumetric video;
a removal of the content item included in the volumetric video;
an addition of a new content item to the volumetric video; and
an application of a filter to the content item in the volumetric video or a real-world object that is visible as part of the presentation of the volumetric content.

15. The system of claim 13, wherein editing the volumetric video comprises at least one of:
modifying a content item included in the volumetric video;
removing the content item included in the volumetric video;
adding a new content item to the volumetric video; and
applying a filter to the content item in the volumetric video or a real-world object that is visible as part of the presentation of the volumetric content.

16. The system of claim 13, further comprising:
receiving a selection of a content item from the presentation of the volumetric content, wherein the edit corresponds to the content item.

17. The system of claim 12, wherein the receiving of the input comprises at least one of:
detecting a gesture by a user of the display device;
detecting the interaction by a user of the display device with one of the interactive elements of the interactive interface provided with the presentation of the volumetric video; and
receiving an input signal from a physical input element that is communicatively coupled with the display device.

18. The system of claim 12, wherein controlling the presentation of the volumetric content by the display device in accordance with the control operation further comprises one of:
stopping the presentation of the volumetric video;
increasing a zoom level of the presentation of the volumetric video;
decreasing the zoom level of the presentation of the volumetric video;
increasing a playback speed of the presentation of the volumetric video; or
decreasing the playback speed of the presentation of the volumetric video.

19. A machine-readable medium storing instructions that, when executed by a computer system, cause the computer system to perform operations comprising:
causing presentation, by a display device, of a volumetric content comprising a volumetric video, the volumetric video comprising a volumetric representation of one or more elements of a three-dimensional space, the causing of the presentation of the volumetric content comprising causing the display device to present the volumetric representation of the one or more elements overlaid on a real-world environment that is visible to a user of the display device, the presentation of the volumetric video comprising a display of an interactive interface comprising a set of interactive elements overlaid on the real-world environment, the set of interactive elements comprising:
a first interactive element to pause the presentation of the volumetric video;
a second interactive element to fast forward the presentation of the volumetric video; and
a third interactive element to rewind the presentation of the volumetric video;
receiving input indicative of a control operation associated with the presentation of the volumetric content based on an interaction with an interactive element from the set of interactive elements, the control operation comprising one of: a pause operation, a fast-forward operation, or a rewind operation; and
controlling the presentation of the volumetric content by the display device by executing the control operation, the controlling of the presentation of the volumetric content comprising:
tracking movement of the user of the display device within the real-world environment;
causing presentation, by the display device, of the volumetric representation of the one or more elements from multiple perspectives while the control operation is being executed based on the tracked movement of the user of the display device, the executing of the control operation comprising one of:
pausing the presentation of the volumetric video based on the input being indicative of an interaction with the first interactive element;
fast forwarding the presentation of the volumetric video based on the input being indicative of an interaction with the second interactive element; or
rewinding the presentation of the volumetric video based on the input being indicative of an interaction with the third interactive element.

20. The machine-readable medium of claim 19, further comprising:
receiving an edit to the volumetric video;
editing the volumetric video based on the edit, the editing of the volumetric video resulting in an edited volumetric video; and
causing presentation, by the display device, of the edited volumetric video.

\* \* \* \* \*